(12) United States Patent
Thomas

(10) Patent No.: US 12,299,590 B2
(45) Date of Patent: *May 13, 2025

(54) KNOWLEDGE-GUIDED SYSTEM FOR AUTOMATED EVENT MONITORING

(71) Applicant: SAP SE, Walldorf (DE)

(72) Inventor: Susan Marie Thomas, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,867

(22) Filed: Mar. 11, 2024

(65) Prior Publication Data

US 2024/0211778 A1 Jun. 27, 2024

Related U.S. Application Data

(63) Continuation of application No. 17/240,501, filed on Apr. 26, 2021, now Pat. No. 11,954,606.

(51) Int. Cl.
| | | |
|---|---|---|
| G06F 17/00 | (2019.01) | |
| G06F 7/00 | (2006.01) | |
| G06F 11/34 | (2006.01) | |
| G06F 16/901 | (2019.01) | |
| G06F 40/211 | (2020.01) | |
| G06F 40/284 | (2020.01) | |
| G06F 40/295 | (2020.01) | |
| G06N 5/022 | (2023.01) | |
| G06N 20/00 | (2019.01) | |

(52) U.S. Cl.
CPC ......... *G06N 5/022* (2013.01); *G06F 11/3476* (2013.01); *G06F 16/9027* (2019.01); *G06F 40/211* (2020.01); *G06F 40/284* (2020.01); *G06F 40/295* (2020.01); *G06N 20/00* (2019.01)

(58) Field of Classification Search
CPC .... G06N 5/022; G06N 20/00; G06F 16/9027; G06F 40/284; G06F 40/211; G06F 40/295; G06F 11/3476
USPC .......................................................... 707/797
See application file for complete search history.

(56) References Cited

U.S. PATENT DOCUMENTS

| | | | |
|---|---|---|---|
| 11,954,606 B2* | 4/2024 | Thomas | G06F 11/3476 |
| 2003/0051026 A1* | 3/2003 | Carter | H04L 63/0263 |
| | | | 709/224 |

(Continued)

*Primary Examiner* — Pavan Mamillapalli
(74) *Attorney, Agent, or Firm* — Fountainhead Law Group, PC

(57) ABSTRACT

Automated event monitoring is performed utilizing a Knowledge Graph (KG) constructed by grouping and consolidation of a variety of log Entry Types. A log entry is received by a knowledge graph parser (Kg parser). That parser finds contiguous sub-strings in a log entry that have a parameterized basic-format. The parser figures out which basic-formats are present, where, and with which parameters. Given a sub-string, its basic-format and its parameters, the parser can correctly parse the sub-string to components (e.g., keys and values if a key-value format; fields if a structured format). A result of the parsing is an entity type tree structure. Next, a grouping and consolidation capability functions to modify the KG to incorporate an incoming new entry type structure. The KG may be consumed by a user (e.g., visualization; querying), and may provide an artifact to an event monitoring system to automatically trigger certain actions (e.g., alerts).

20 Claims, 23 Drawing Sheets

(56) References Cited

U.S. PATENT DOCUMENTS

| | | | |
|---|---|---|---|
| 2003/0182102 A1* | 9/2003 | Corston-Oliver | G06F 40/56 |
| | | | 704/9 |
| 2014/0108462 A1* | 4/2014 | Pfeifle | G06F 16/29 |
| | | | 707/795 |
| 2018/0307576 A1* | 10/2018 | Debnath | G06F 11/34 |
| 2021/0182480 A1* | 6/2021 | Thomas | G06F 40/137 |
| 2021/0374153 A1* | 12/2021 | Saxena | G06F 16/24 |

* cited by examiner

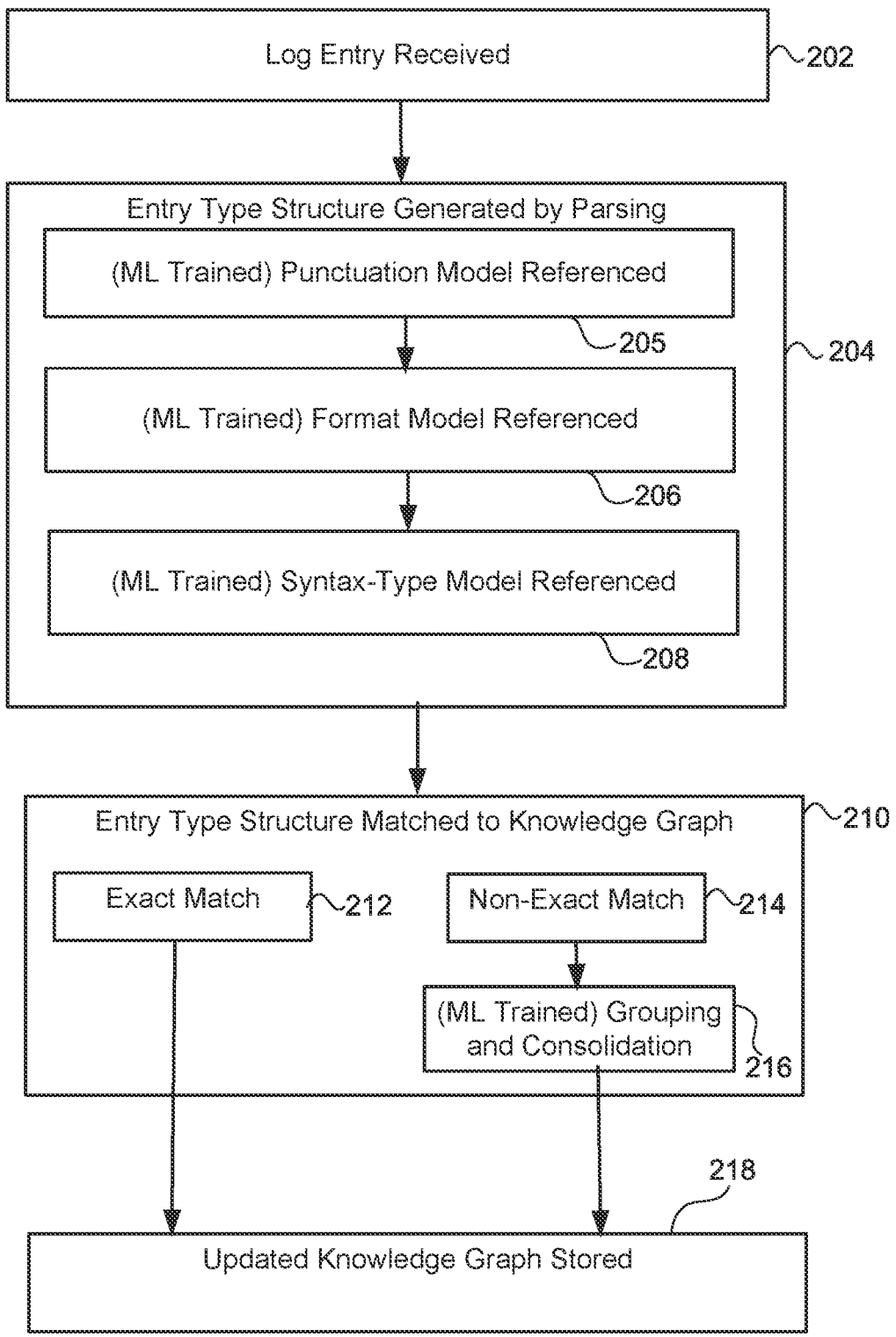

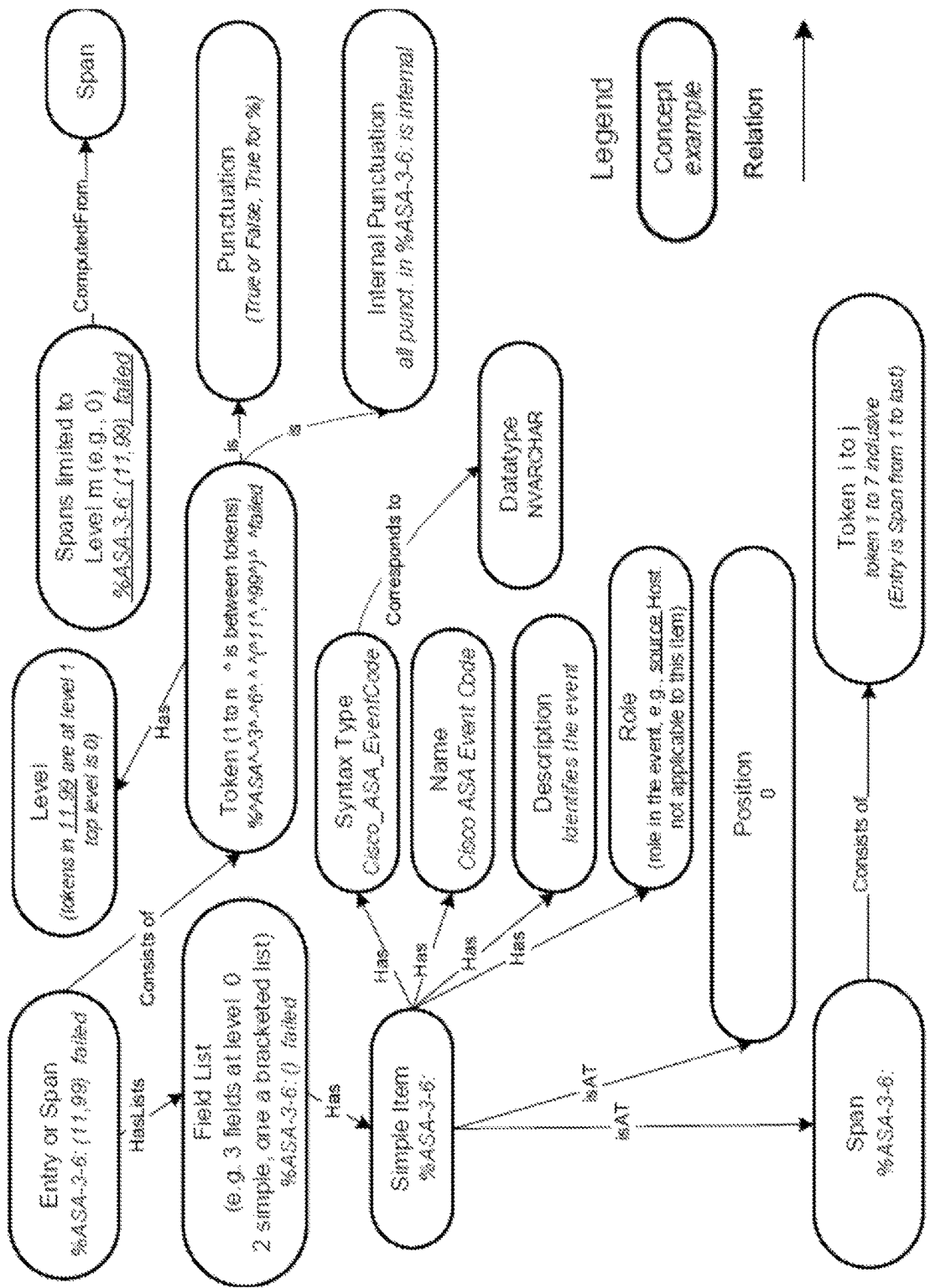
FIG. 8    Parsing Concepts: Overview and Field List

Parsing Concepts: Key-Value List, Nested,

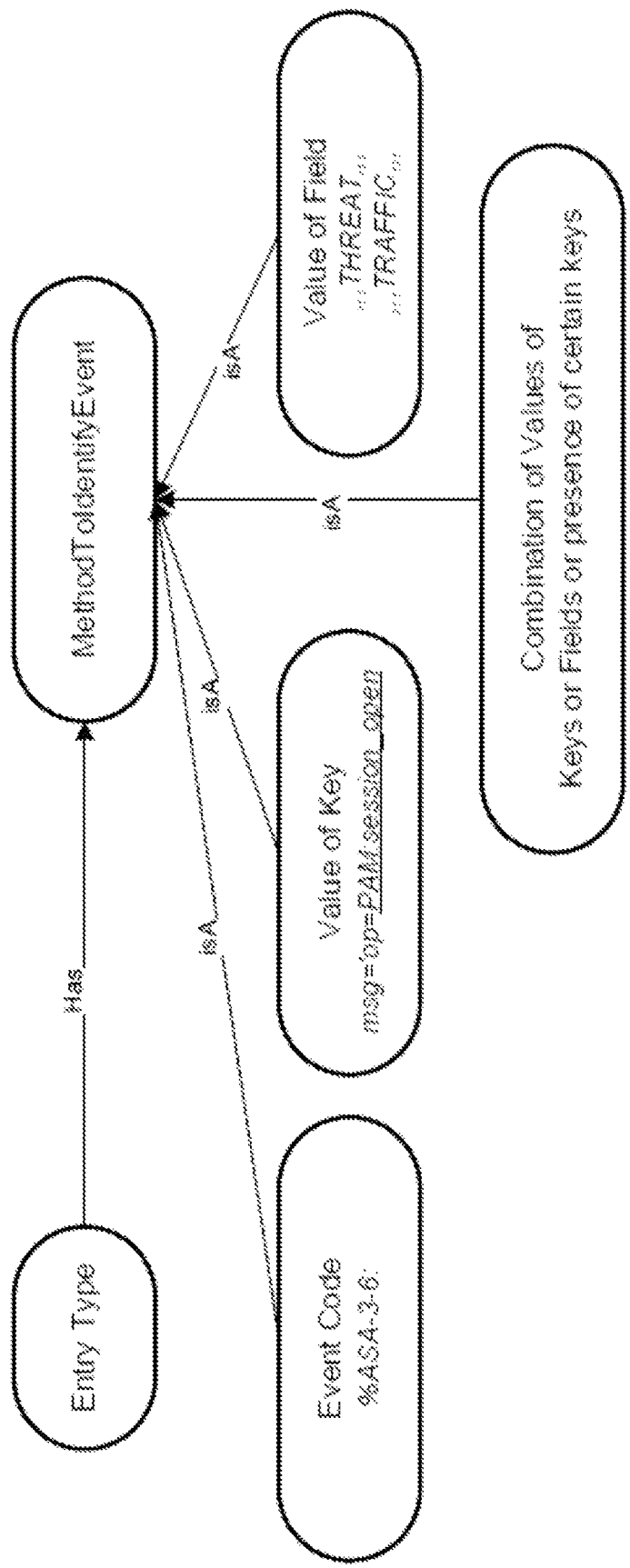
FIG. 10 Entry Type Concepts: Method to identify event

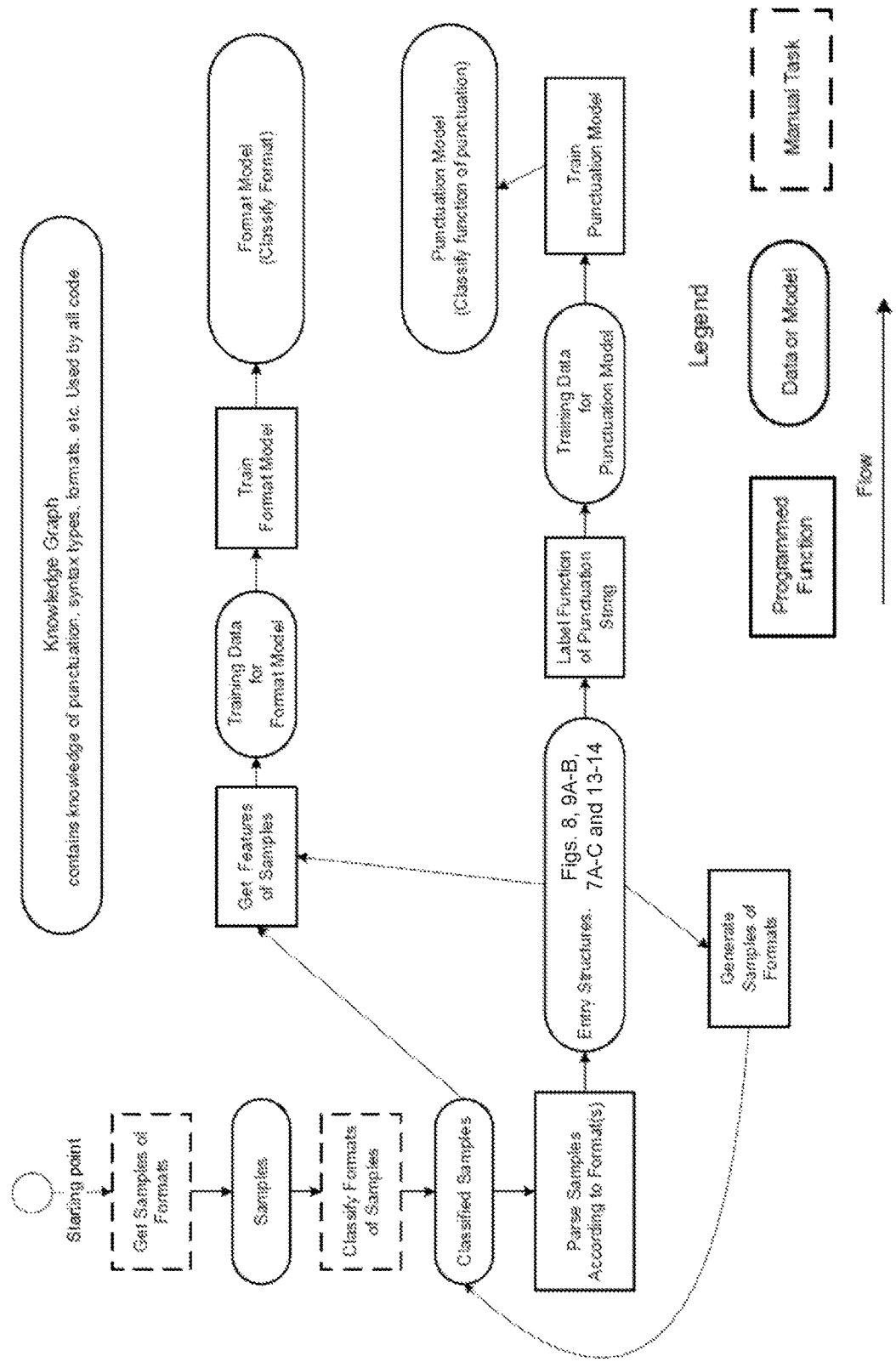
FIG. 11  Bootstrap of Knowledge-guided Parser

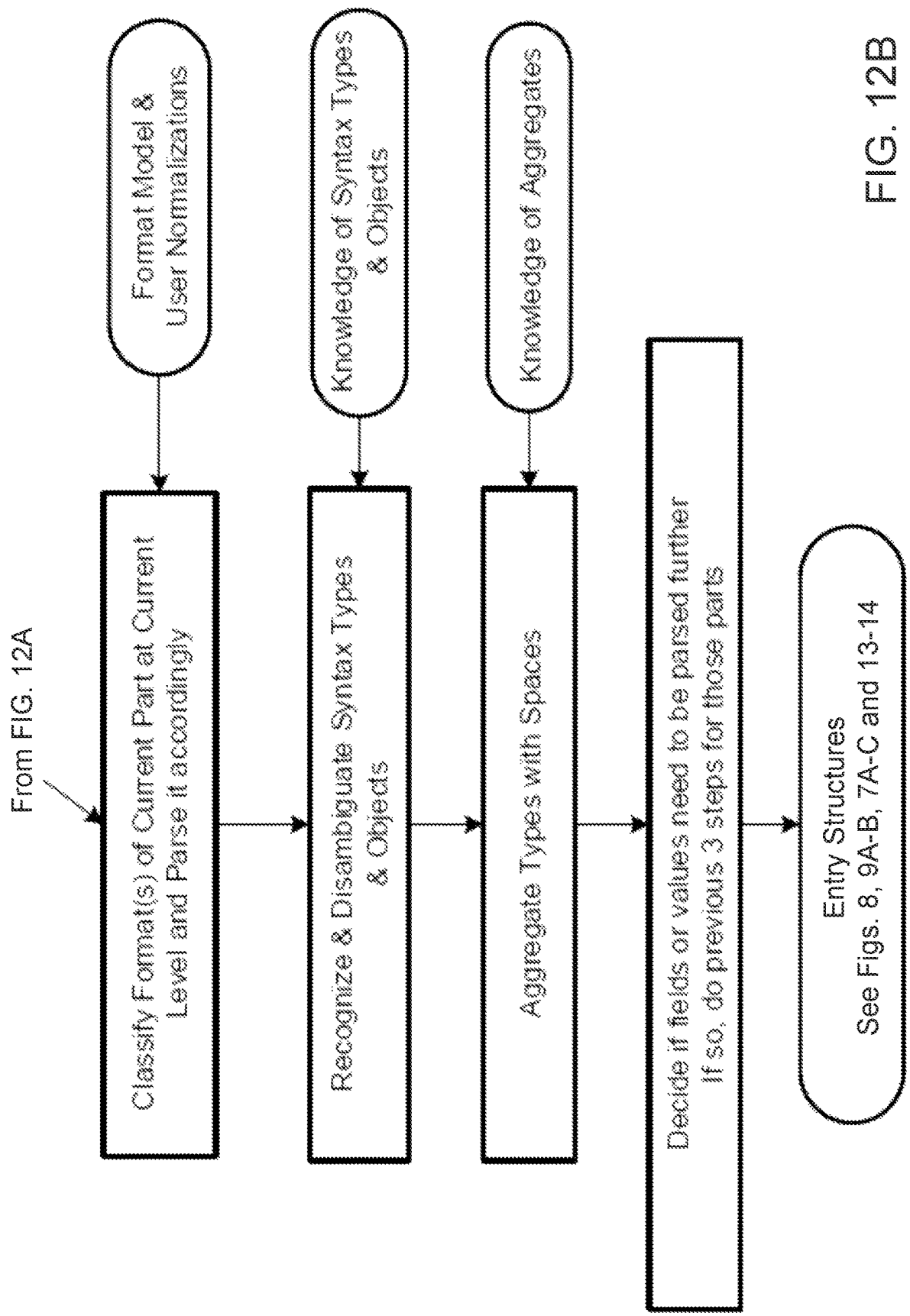

```
EntryType:
id: 11 # Identifier assigned by KG
sample: > # single line of text shown on multiple lines
  '2019-06-27T09:32:12.928055+00:00 ip-10-0-0-12 sudo: root :
  PWD=/users/ips  USER=ixxxxxx
  COMMAND=/bin/sh -c cd ~ && git config --get push.default > /dev/null'
formats: # There are 2 formats, a structured followed by a key-value format.
- basic_format: structured
  separator: ' '
  fields:
  - syntax_type: timestamp
    sample: '2019-06-27T09:32:12.928055+00:00'
  - syntax_type: hostname
    sample: ip-10-0-0-12
  - syntax_type: word
    sample: sudo
  - syntax_type: word
    sample: root
- basic_format: key_value
  pair_separator: ' '
  key_value_separator: '='
  keys_single_word: True # Knowing this helps to parse the entry correctly
  value_ends_entry: True # Value of last key extends to end of entry
  key_form: all_capitals # Helps verify keys correctly found
  key_values:
  - key: PWD
    syntax_type: path
    sample: /users/ips
  - key: USER
    syntax_type: global_user
    sample: ixxxxxx # fake value to anonymize
  - key: COMMAND
    object_type: command
    sample: '/bin/sh -c cd ~ && git config --get push.default > /dev/null'
```

FIG. 13A

FIG. 14 Representation of recursion

KNOWLEDGE-GUIDED SYSTEM FOR AUTOMATED EVENT MONITORING

CROSS REFERENCE TO RELATED APPLICATION

This application is a continuation of, and claims priority to, U.S. patent application Ser. No. 17/240,501, filed Apr. 26, 2021, the contents of which are incorporated herein by reference.

BACKGROUND

Unless otherwise indicated herein, the approaches described in this section are not prior art to the claims in this application and are not admitted to be prior art by inclusion in this section.

Staff who are working at log-monitoring centers may be exposed to a large volume of software logs. These logs may be underutilized due to the large manual effort required to access the information contained therein.

Such manual effort can take the form of creating and testing regular expressions to extract fields from an event. Without this manual effort, the content of logs is invisible and hence, unusable. Unseen and unused information may undesirably result in undetected attacks, data leaks, and/or violations of service-agreements.

SUMMARY

Automated event monitoring is performed utilizing a Knowledge Graph (KG) constructed by grouping and consolidation of a variety of log Entry Types. A log entry is received by a knowledge graph parser (Kg parser). That parser finds contiguous sub-strings in a log entry that have a parameterized basic-format. The parser figures out which basic-formats are present, where, and with which parameters. Given a sub-string, its basic-format and its parameters, the parser can correctly parse the sub-string to components (e.g., keys and values if a key-value format; fields if a structured format). A result of the parsing is an entity type tree structure. Next, a grouping and consolidation capability functions to modify the KG to incorporate an incoming new entry type structure. The KG may be consumed by a user (e.g., visualization; querying), and may provide an artifact to an event monitoring system to automatically trigger certain actions (e.g., alerts).

The KG may be referenced to correlate the entry type of the message, to a relevant use case. Based upon the particular use case, appropriate artifacts can be generated and communicated to a Security Information and Event Management (SIEM) system for analysis of the log entry and follow-on action (e.g., issuing an alert to a security team).

The following detailed description and accompanying drawings provide a better understanding of the nature and advantages of various embodiments.

BRIEF DESCRIPTION OF THE DRAWINGS

FIG. 2 shows a simplified flow diagram of a method according to an embodiment.
FIG. 8 shows an overview and field list of parsing concepts.
FIG. 10 shows a diagram illustrating a method to identify an event.
FIG. 11 shows a bootstrap of a knowledge-guided parser in an embodiment.
FIGS. 12A-B show a flow diagram for a knowledge-based parser.
FIG. 13A shows an entry type tree structure in yaml.

DETAILED DESCRIPTION

Described herein are methods and apparatuses that implement automated event monitoring. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
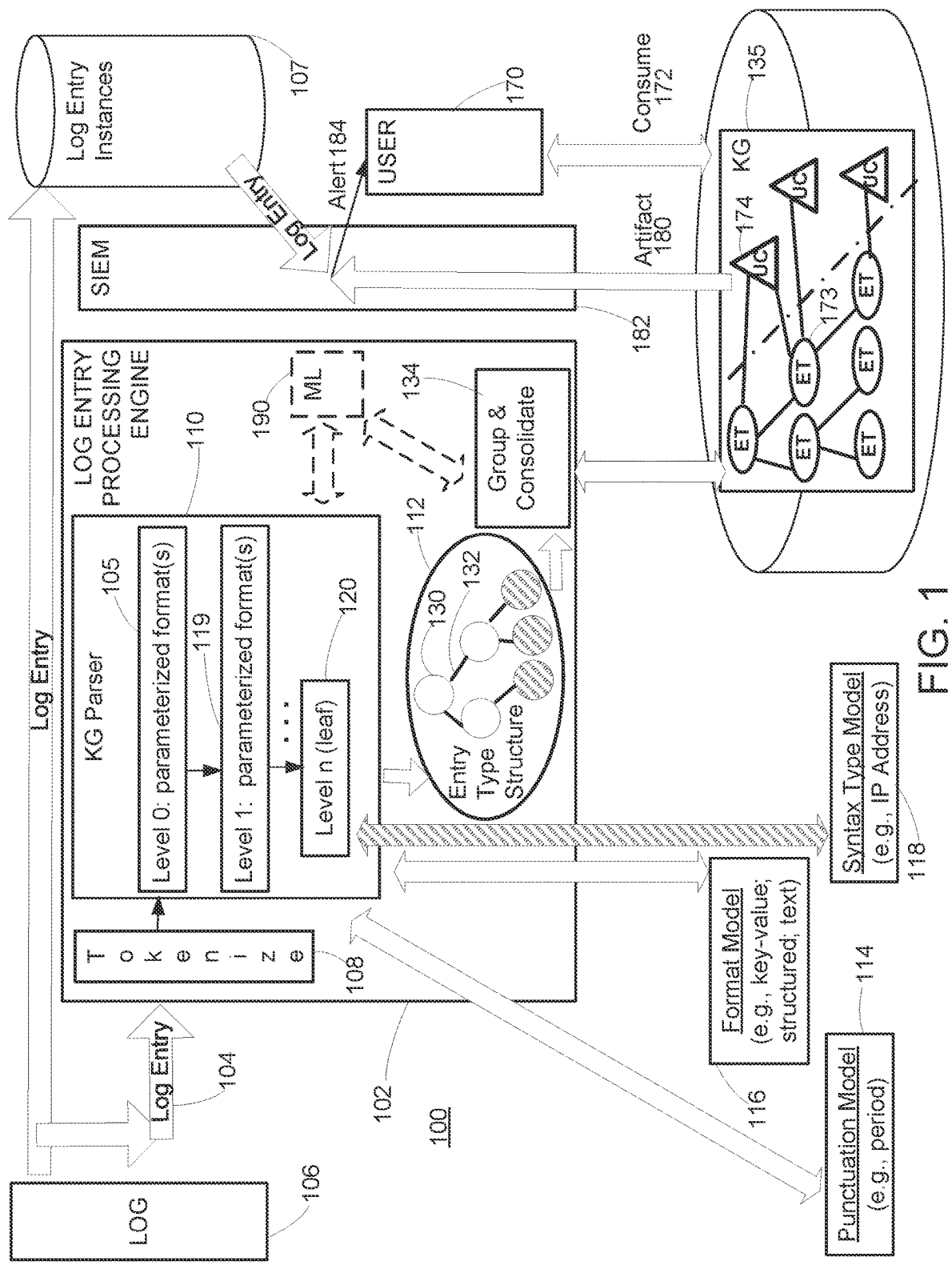
FIG. 1 shows a simplified diagram of a system according to an embodiment.

FIG. 1 shows a simplified view of an example system that is configured to implement event monitoring according to an embodiment. Specifically, system 100 comprises a log entry processing engine 102 that is configured to receive a log entry 104 from a log source 106.

It is noted that the log entry is also communicated for storage as a log entry instance 107. As is described below, that log entry instance may be subsequently referenced for later processing (e.g., to generate an alert to a user).

The log entry received by the engine, is first subjected to a tokenization procedure 108. That tokenization is specifically based upon the punctuation of the incoming log message.

According to one specific embodiment of a tokenization procedure, punctuation characters are each considered as being one token. And, characters between two punctuation characters are considered as being another token.

A KG Parser element 110 receives the tokenized output, and seeks to determine an entry type structure 112. In particular, the KG parser recognizes that individual log entry formats and parameters define a hierarchical structure. Typically, this hierarchical structure is a tree.

The KG parser references various models (punctuation model 114, format model 116, syntax-type model 118) in order to disambiguate the meaning of various levels of the hierarchical structure. Disambiguation can involve determining answers to one or more of the following questions.

Does a punction character enclose items or separate them?
Does a punction character separate a key from a value?
Is a punctuation character internal to a syntax type?

The KG parser functions to find contiguous sub-strings in a log entry that have one parameterized basic-format. The parser determines:

which basic-formats are present,
where (e.g., at what hierarchy level) those basic formats are present, and
with which parameter the basic formats are associated.

Given a sub-string and its basic-format and its parameters, the KG parser can accurately parse the sub-string into components (e.g., keys and values if a key-value format; fields if a structured format). Note that freetext is a structured format, with space separators and also has natural language text of content of the log entry (e.g., what occurred).

The parsing occurs on a hierarchy level-by-hierarchy level of the log entry. Parsing determines a structure and format starting from a top hierarchy level 105 with reference to format model 116. Such a format model may indicate the existence of a key-value pair as one format type, for example. Other format types can include structured format (with fields), or text.

Eventually the KG parser reaches down through intermediate hierarchy levels 119 identifying individual log entry formats and parameters, to reach a lowest level in the hierarchical structure, indicating leaf node 120.

Nodes in the entry type tree structure are format, object, or syntax type. Formats occur at all levels except the leaves, which can be objects or syntax types.

Figure 1A:
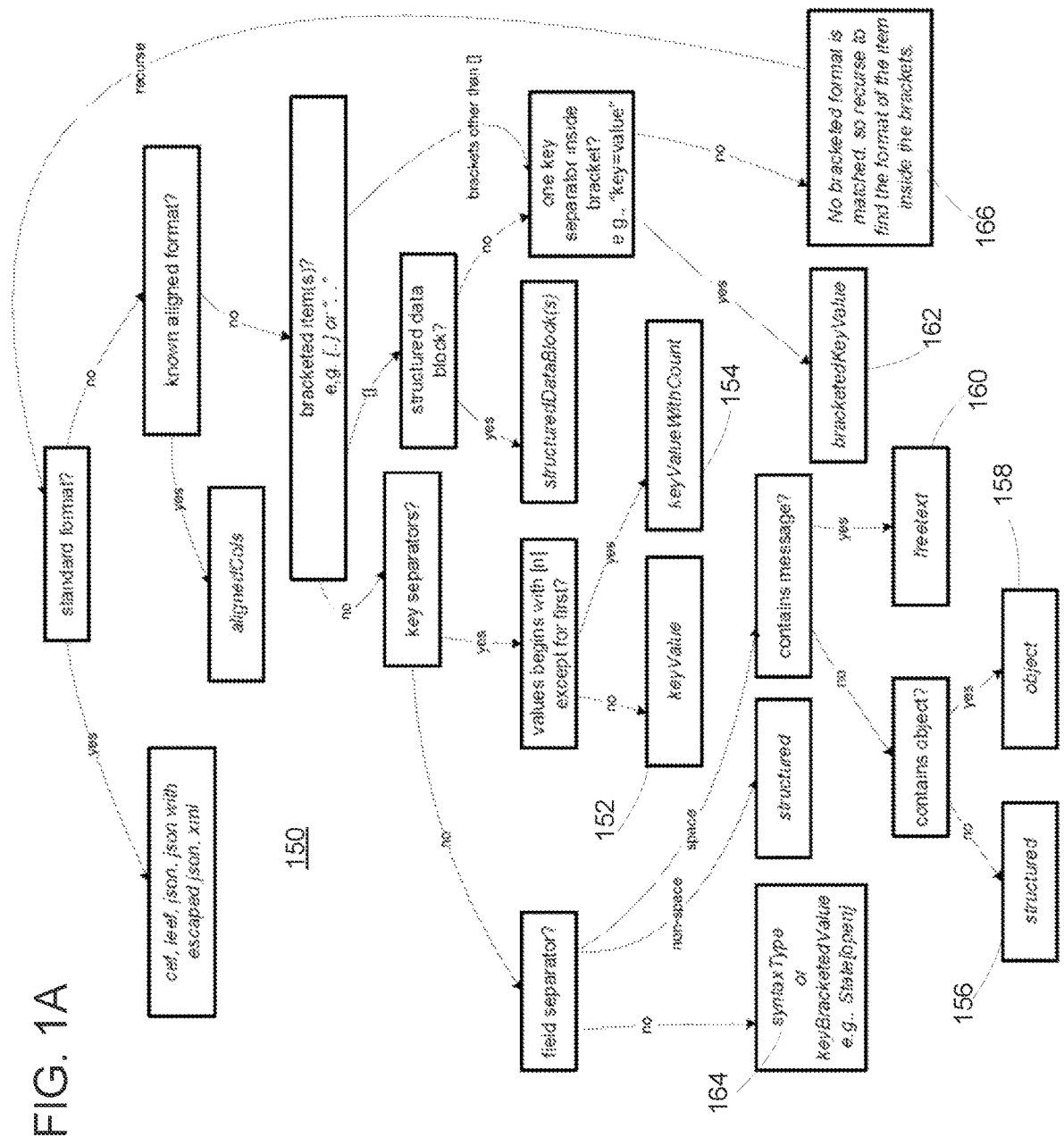
FIG. 1A shows a format decision tree according to an embodiment.

FIG. 1A shows details of one possible example of parsing 150 that is based upon a format model. This decision tree represents a rule-based determination of format, which complements the machine learning and can also be used to create initial training data for machine learning.

In FIG. 1A, the leaf nodes reflect identification of known parameterized basic formats including:

key Value 152;
key Value With Count 154;
structured 156;
object 158;
freetext 160;
bracketedKey value 162.

The leaf node 164 is either a syntax type or the keyBracketedValue Format. In any case its type is recognized.

Specifically, the KG parser may further reference the syntax-type model 118 in order to identify those elements of the log entry that are not further parsable. One example of such an entry type element is an IP address that conforms to a known structure. Other examples of such an entry type element are a MAC address, and an aggregate (e.g., timestamp) as discussed below.

Parsing according to the format model may result in leaf nodes that are not recognized as known parameterized basic formats. This is shown in FIG. 1A as 166.

In particular, at node 166 the text (span) being processed is enclosed in brackets, but none of the known formats with brackets were matched. So, the brackets are removed and the text inside is examined starting at the top of the decision tree, shown as a 'recurse' arrow. Recursion is discussed later below in connection with FIG. 14.

The output of the KG parser is the entry type structure. The entry type structure includes nodes 130 representing elements of an entry type, and links 132 representing links between those elements. As mentioned above, the entry type structure is typically a tree.

Having generated the entry type structure from the log entry, the KG parser then performs a Grouping, and Consolidation capability 134. This compares the entry type structure to the KG 135.

Under some circumstances, comparison may result in a match of the entry type structure with an entry type in the KG. Then, no new entry type structure is present.

However, under other circumstances the log entry structure is new and merely exhibits similarity to entry types within the KG. Then, the capability 134 functions to group and consolidate the nodes of the KG to incorporate the incoming new entry type structure.

Specifically, the capability receives the KG and the new entry type structure as input. If the entry type is new, it is added to the KG at the appropriate position within the hierarchy of entry types. Such modification of the KG can also result in grouping and consolidation of the nodes of the knowledge graph to better reflect the presence of the new entry type structure.

One role of the KG to conceptualize the (hierarchical) relationships between various known log entry types. Visualizing such log entry types in a hierarchical structure, can aid in the rapid and intuitive diagnosis of issues.

For example, KG visualization may rapidly reveal different clusters (groups) of log entry types, to be the result of a single underlying problem rather than two separate problems. Hence, FIG. 1 shows a user 170 directly consuming 172 the KG. This consumption may comprise inspecting the KG and posing queries thereto.

However, another role of the KG is to correlate the known log entry types 173 with Use Cases (UCs) 174. Details regarding UCs are described below in connection with FIGS. 4-6B.

Such UCs may be used to generate artifacts 180. These artifacts are in turn received and processed by a Security Information and Event Management (SIEM) 182.

In particular, the SIEM receives both a UC-derived artifact, and the original log entry instance 107. Based upon the artifact received, the SIEM generates a corresponding action (e.g., issuing alert 184 to the user).

Consider the following example. Comparing an incoming entry type structure reveals similarity to a "failed login" entry type of the KG. A "security" UC is correlated to that "failed login" entry type—encoding knowledge of "failed login" as a symptom of an attack. That is, a member of the security team might understand failed logins to reveal a security issue. Accordingly an artifact derived from the UC, could be input to cause the SIEM to automatically issue an alert to the security team.

FIG. 1 indicates that one or more activities of the event monitoring system may be performed according to one or more Machine Learning (ML) procedures 190. For example, such ML procedures can be used to train one or more of the punctuation, format, and syntax-type models that are referenced by the KG parser.

ML can also be referenced by the engine in performing grouping and/or consolidation with the KG. That is, historical experience of grouping and consolidation for incoming entry type structures, may be useful to accurately match a current incoming entry type structure with the KG.

FIG. 2 is a flow diagram of a method 200 according to an embodiment. At 202, a log entry is received.

At 204, an entry type structure exhibiting a hierarchy, is generated by parsing the log entry. Typically, the entity type structure is in the form of a tree.

Specifically, at 205 a punctuation model is referenced. At 206, a format model is referenced to parse the log entry into parameterized basic formats. One example of such a basic format is a key-value pair. The format model may be trained according to a ML procedure.

At 208 a syntax-type model is referenced to classify leaf nodes of the tree. Examples of such syntax types can include basic data element such as numbers and IP addresses, and aggregates such as time stamps. The syntax-type model may be trained according to a ML procedure.

At 210 the entry type structure is matched to a KG. At 212 an exact match with the KG is revealed. Then, the KG may simply be updated to reflect different statistics—e.g., the additional occurrence of an existing entry type in the KG.

By contrast, at 214 a non-exact match may be revealed. Then, KG is updated by grouping and consolidation 216 to reflect the new entry type structure. This grouping and consolidation may be trained according to a ML procedure.

Thereafter, the updated KG is stored 218 and hence available for consumption. As mentioned above, the KG may be consumed by a user directly (e.g., for visualization and/or querying). The KG may also be consumed by another system, for example a SIEM system that receives a UC-derived artifact and in response automatically issues an alert.

Systems and methods for event monitoring according to embodiments, may avoid one or more issues associated with conventional approaches. In particular, embodiments provide automatic visibility into the contents of logs, without incurring substantial effort to write separate parsers for logs from different vendors, or write regular expressions to extract fields for particular use cases.

Embodiments also allow users to see and control the parsing methods, and recognize the relationships between logs from different vendors. This benefit is conferred by using a KG for storing and visualizing meta-data about entry types that are found in logs.

Embodiments may also impart flexibility and adaptability. By avoiding resort to ad-hoc parsers and their regular expressions, consistency and reproducibility in event monitoring may be achieved.

Further details regarding event monitoring according to various embodiments, are now provided in connection with the following example.

EXAMPLE

The system of this exemplary embodiment automatically parses and classifies log entries upon arrival, providing visibility into log content. A knowledge graph (KG) continuously updates as it encounters new entry types.

The KG may be consumed by a SIEM. For this specific example, the KG may be consumed by the Enterprise Threat Detection (ETD) product available from SAP SE of Walldorf, Germany. In particular, artifacts provided from the KG would allow ETD to monitor incoming log messages and to automatically provide appropriate follow-on actions.

Figure 3:
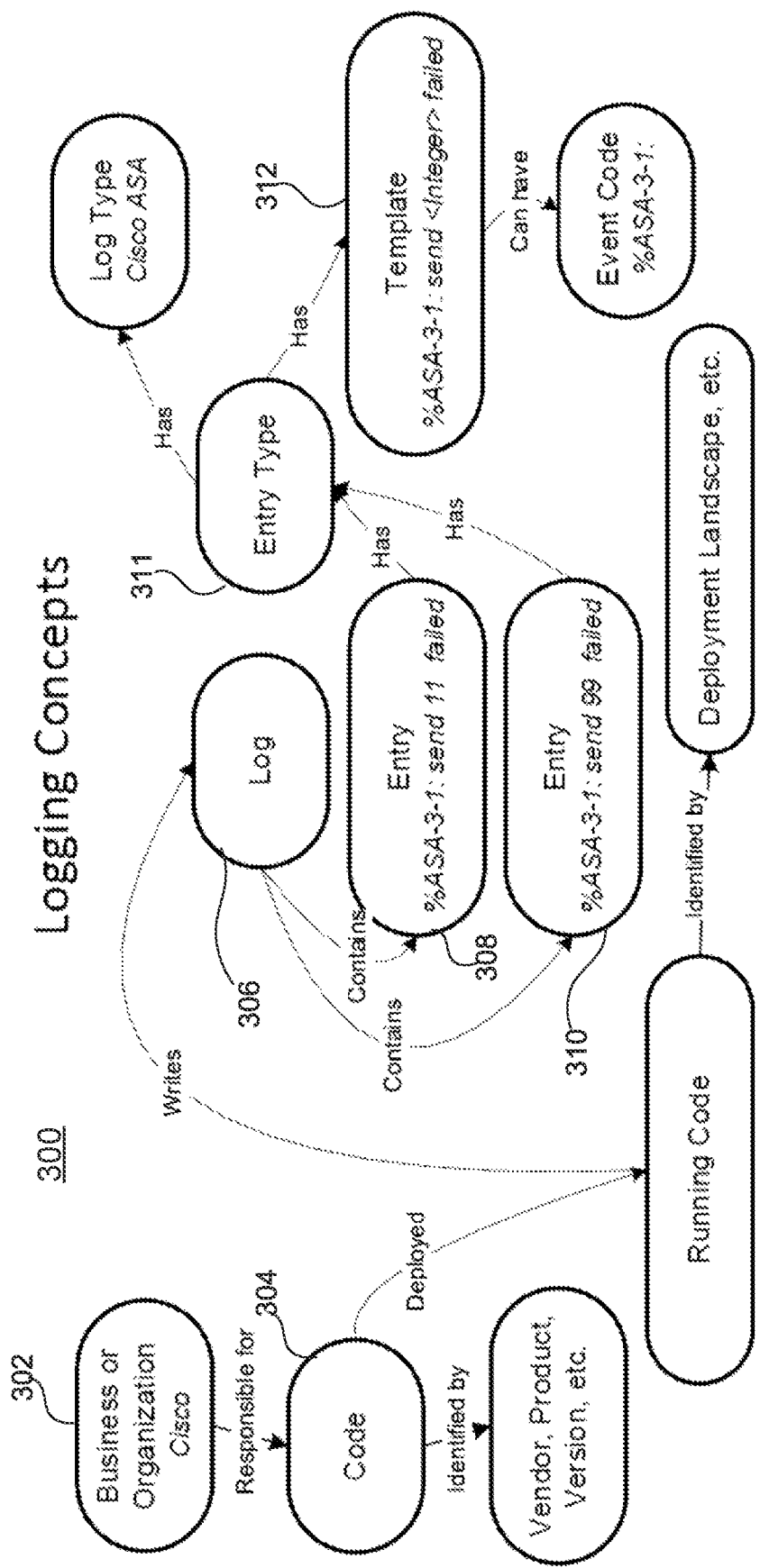
FIG. 3 shows a simplified flow diagram illustrating logging concepts.

FIG. 3 is a simplified diagram 300 illustrating concepts for understanding entry type and logging. An organization 302 (Cisco, in this example) is responsible for code 304 that is often identified by:
vendor,
product, and
version.

The code is deployed, e.g., on a server or in a cloud landscape. The deployed code writes entries to a log 306.

Each entry has a type. For example, the two entries 308, 310 in FIG. 3 have the same entry type 311. They differ only by a slot for a variable number. Such a free-text entry type is represented by a template 312 with placeholders, e.g. <integer>, for the variables.

Figure 4:
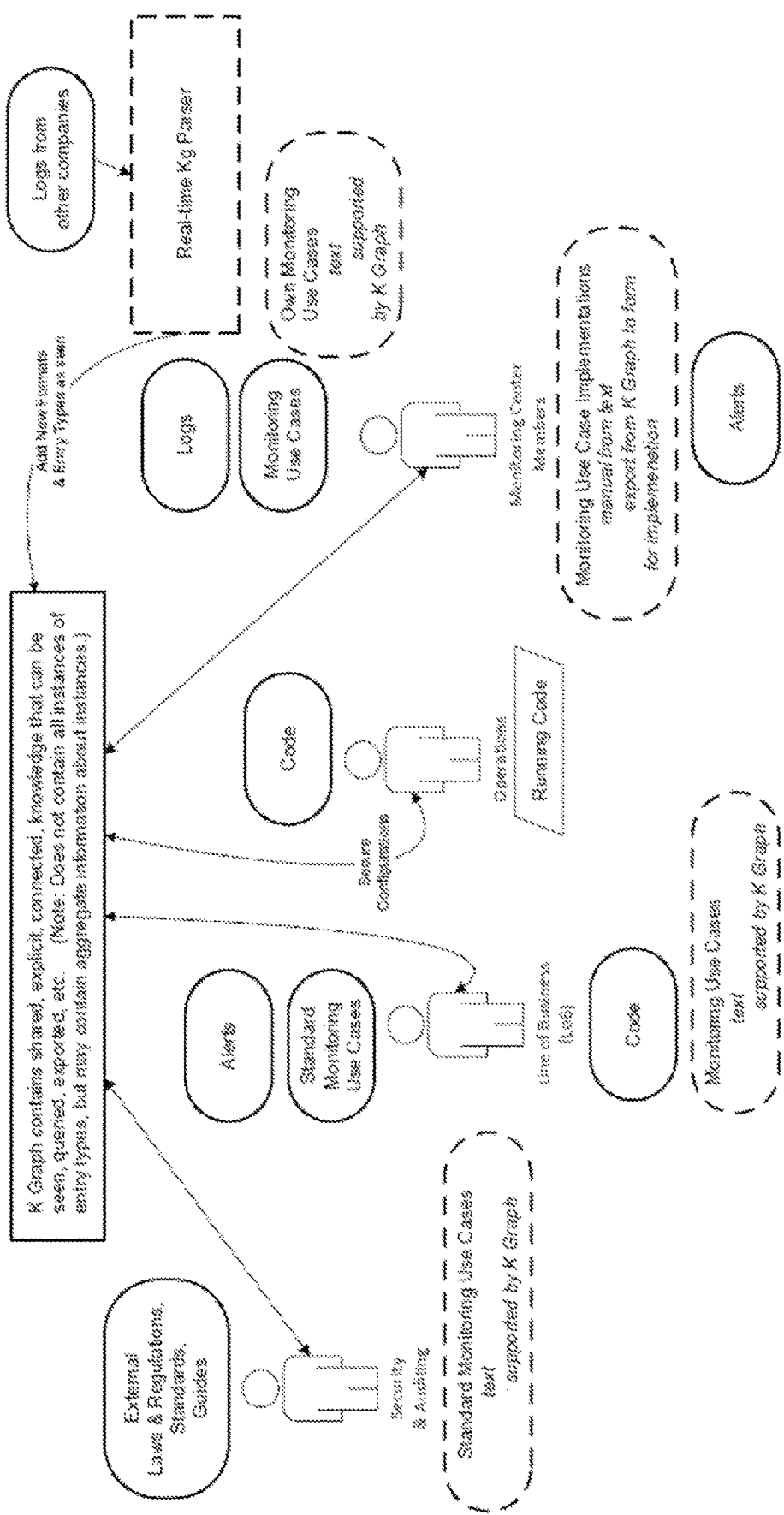
FIG. 4 shows a simplified block diagram illustrating event monitoring according to an example.
Figure 5:
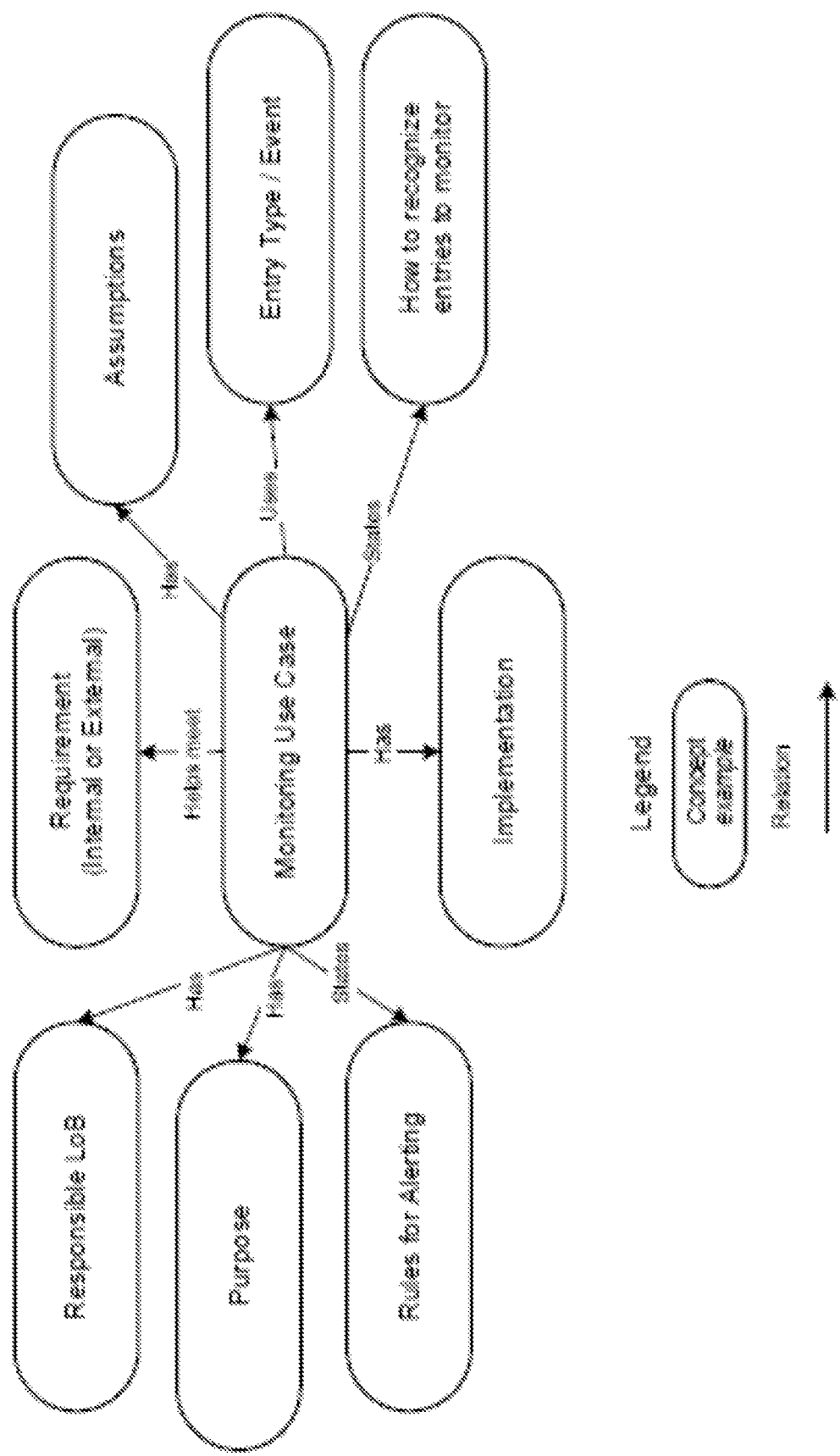
FIG. 5 shows a simplified diagram illustrating the monitoring of use-case concepts.

According to embodiments, the KG allows the Kg Parser to automatically parse and classify log entries upon receipt. FIG. 4 represents an exemplary system and its use by departments that are involved in event monitoring.

On the left side of FIG. 4 is the knowledge graph, which automates the implementation of monitoring use cases. On the right side of FIG. 4 is shown the knowledge-guided parser, which affords out-of-the-box visibility into, and processing of logs using the knowledge graph.

By utilizing the concept of use cases, embodiments allow elements of a log entry to be recognized and addressed when writing monitoring rules. Those log elements are created by the parser.

Here, use-case creation and implementation are supported by (and stored in) the KG. The KG provides visibility and understanding, and promotes uniformity of entry types across company products. This approach avoids the tedious and error-prone process of manually producing and working from unstructured text.

Storing the monitoring use-cases in the KG, permits the system to automatically assess the relevance of new entry types for monitoring purposes. These various use cases may be represented in terms of the concepts shown in FIG. 5.

Below is a sample of one log entry type with a key-value format.

Timestamp="2021-02-22T16.04.46.623+0000",
   Account="jack", Application="service42",
Permissions="null", Hostname="vm00100", ip_address="192.168.0.1",
custom={"USER_ID":"User-003","message": "User has no permissions to operate at account jack"}

If the system has seen any instances of this entry type, it will have added the format and the keys to its knowledge of entry types. Any instance that contains the keys will be considered to be of that entry type.

In the above sample, there are some nested keys (e.g., "USER_ID" and "message" are nested in the custom key). Assume that a security expert decides that this entry type needs to be monitored, and an alert should be generated under certain conditions such as when the message starts with a certain string.

Such a feature might be expressed as follows:
Rule for Alerting
   If custom^message starts With "User has no permissions to operate at account" and
   entryType=<id for entry type>
   then create Alert Here, the nesting is represented above by using the ^ symbol to link the chain of nested keys.

These rules are stored in the knowledge base and linked to the corresponding entry type and monitoring use-case which describes why the rule is needed.

A monitoring use case can also be related to external standards that specify which types of events have to be monitored in order to conform to the standard.

Because the system knows the structures of entry types, it is possible to create rules that use the structure to specify conditions (as in the above example that uses a nested key).

If the entry type has a structured format (e.g., comma-separated list) the rules can refer to a field by its order in that list.

Departments that have use cases would write them in a form that can be imported into the system, and exported to an implementation format. This reduces the implementation burden on the monitoring center, avoiding errors caused by misinterpretations of text.

Figure 6A:
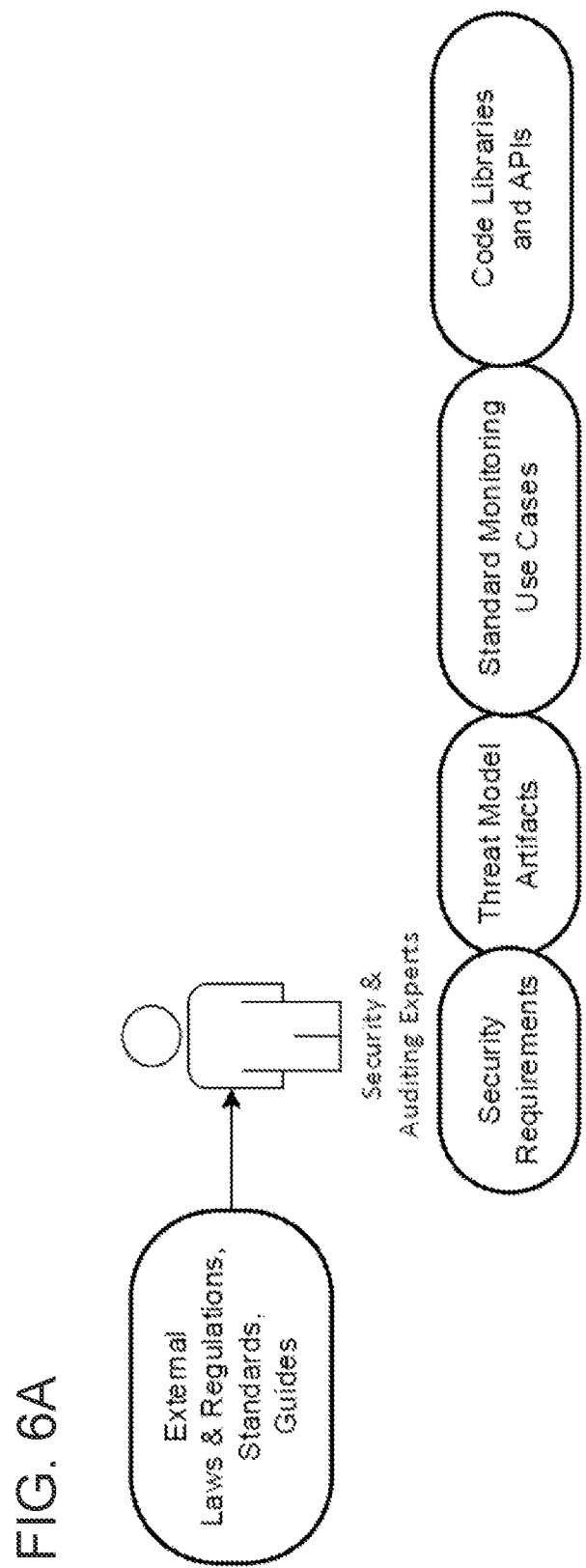
FIGS. 6A-B show the use and creation of artifacts.
Figure 6B:
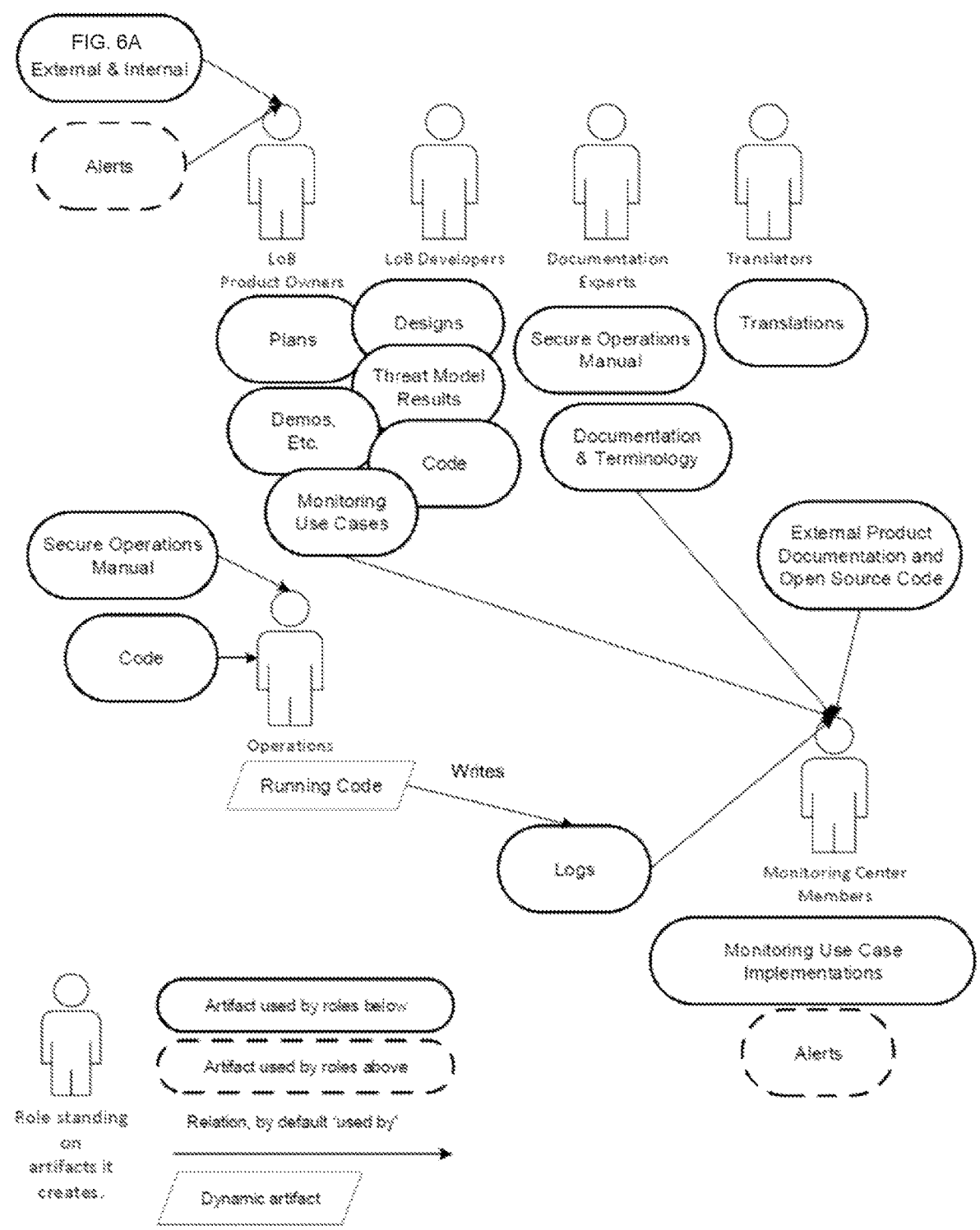

For security monitoring, the KG also represents information from artifacts related to a larger protective process that includes threat modelling, implementing security controls, and awareness of software vulnerabilities. FIGS. 6A-6B show the relations between people and artifacts for this context.

An overview of parsing approaches is now provided. The Kg Parser re-frames parsing in terms of the recognition and disambiguation of formats, syntax types, and the function of punctuation.

Some functions of punctuation involve the separation of items, the grouping of items, or being internal to a string that represents a syntax type (e.g., the dots in a MAC address are internal to it.) Knowledge about syntax types, formats, punctuation, and their inter-relation(s) is stored in a KG and guides the parser's actions.

Tokenization of content and punctuation, allows the parser to focus on punctuation. Non-destructive tokenization and parsing make the context of items easy to access. This is important since context aids both disambiguation and parsing.

The parser uses the recursive nature of entries to reduce complexity to a few basic formats that are distinguished by parameters. For example a basic key-value format has as parameters, the equals sign to separate keys from values and a comma to separate key-value pairs.

Figure 17:
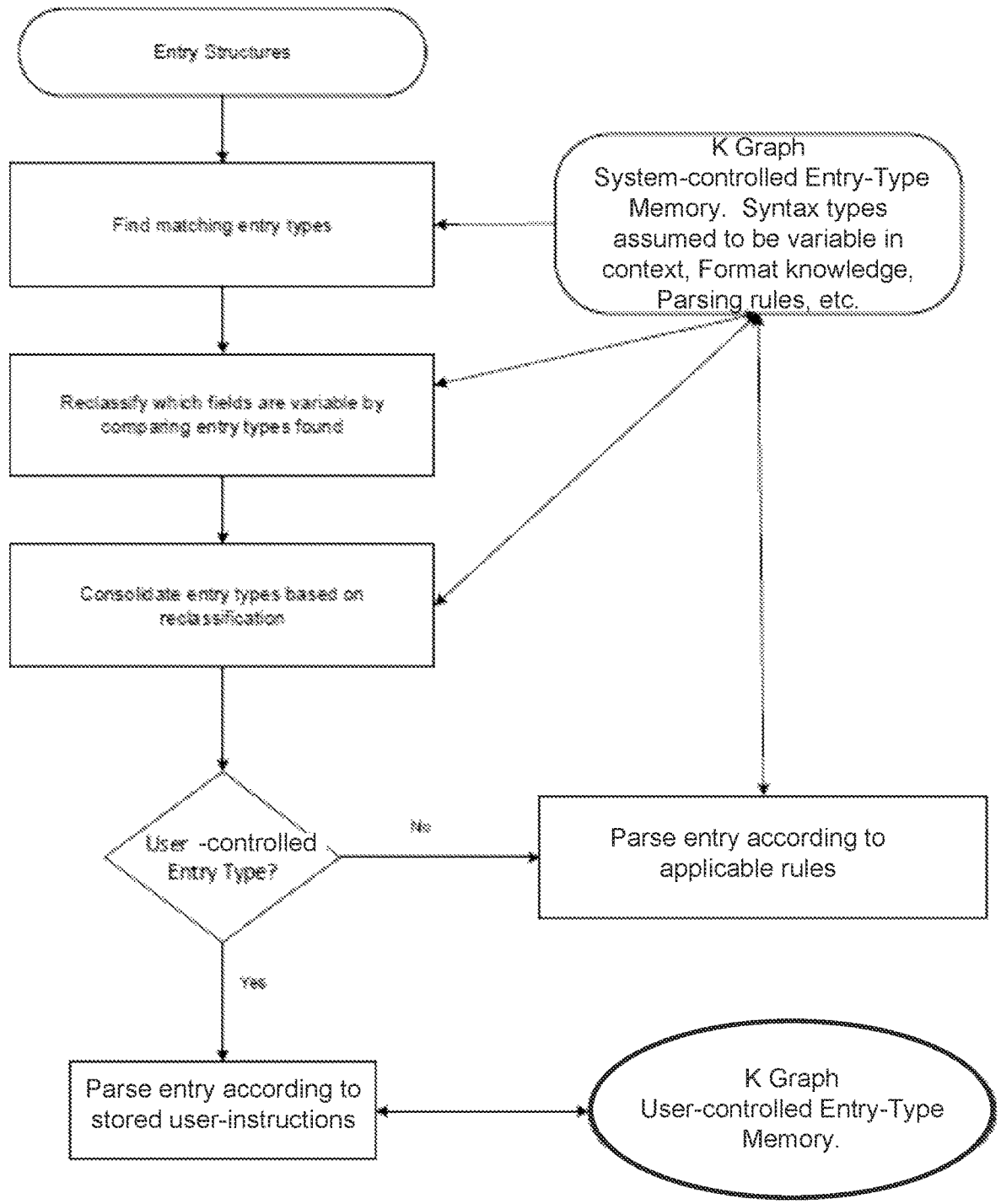
FIG. 17 shows a simplified flow diagram illustrating entry processing according to an embodiment.

If appropriate, these parameters can be adjusted by a user to control parsing of specific entry types. For example, FIG. 17 is a simplified flow diagram showing entry processing according to an embodiment. Depending upon whether an entry type is a user controlled entry type, the manner of parsing may be determined according to stored user-instructions.

Figures 7A, 7B:
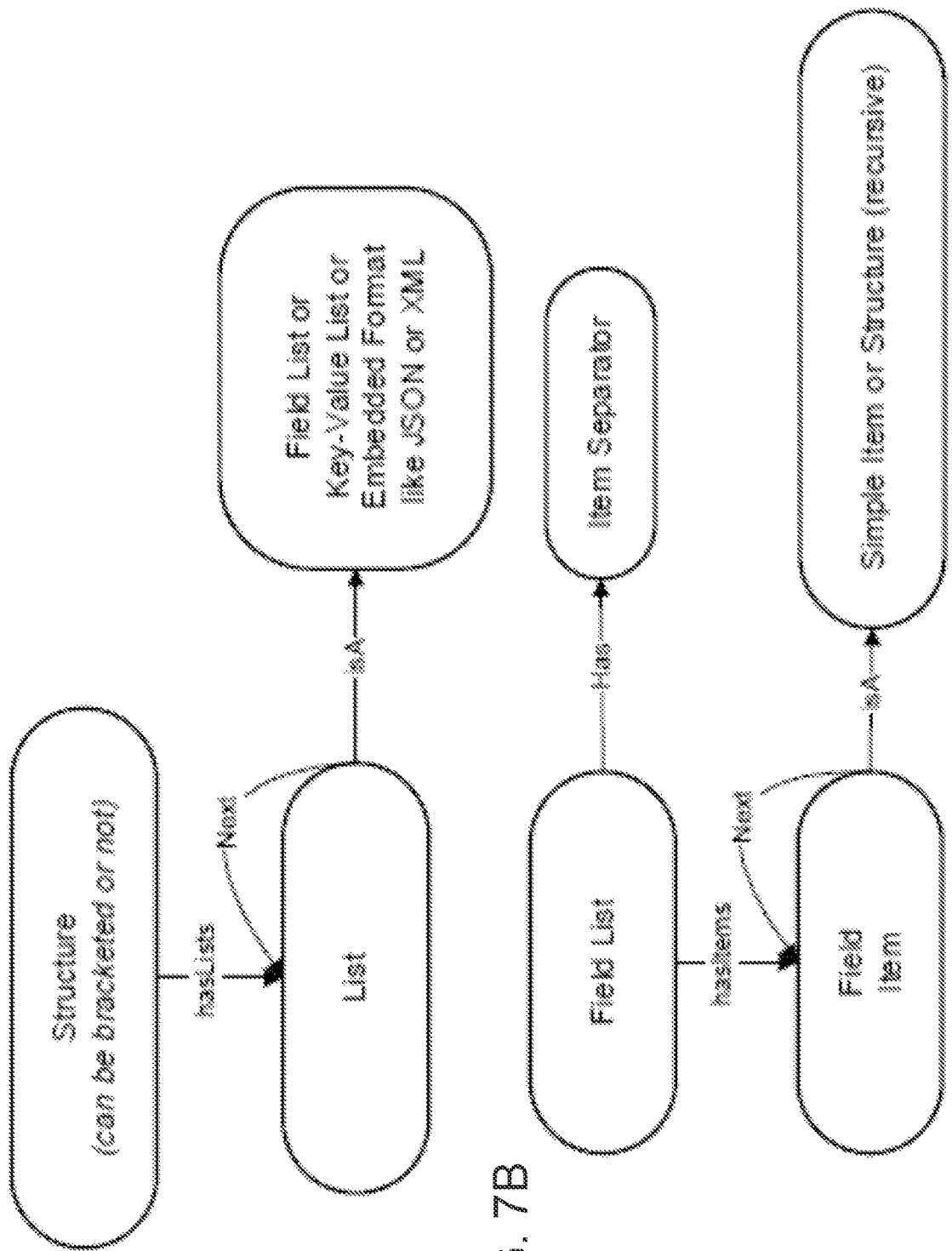
FIGS. 7A-C show format of entries and entry types as recursive structures.
Figure 7C:
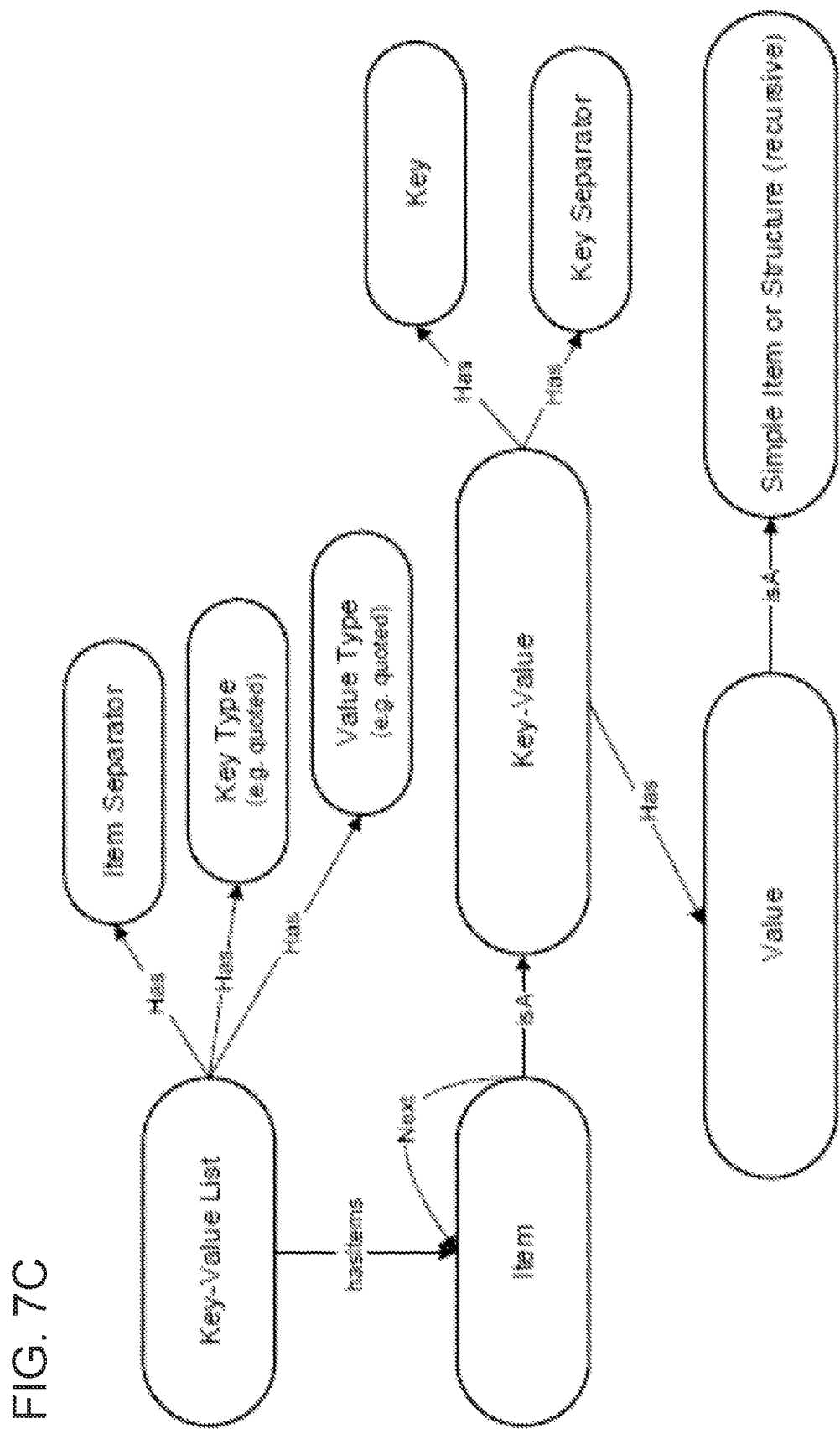

FIGS. 7A-C represent the potential recursive structure of entries. An entry is a structure, a series of lists, each of which can be a field list or a key-value list.

An item in a field list can be simple. That is, an item may have a syntax type.

Alternatively, an item in a field list can be a structure. This is where recursion comes in.

Similarly, the value of a key-value can be simple or can be a structure. One task of the parser is to determine the type and extent of the two types of lists.

For this purpose, the parser uses knowledge of punctuation, syntax types, formats and entry types. The parser may also use machine learning in this task.

Note that the extent of a field item or key-value can be delimited by brackets that enclose it. These brackets create a nested structure that also guides the parser. Brackets can include parentheses symbols such as [ ], and single and double quotes.

A feature of the structures created by parsing, is that items in them are addressable. Some examples of addressing items are given below.

Addressability of items permits their use in statements and conditionals. This feature is useful for exporting artifacts to implement monitoring use cases.

A simple example of addressing is to use the name of a key to access the value of the key. On the other hand, fields are addressed by their relative positions, starting with position zero.

As mentioned above, ML may be used in parsing. The parser can be aided by machine learning for classifying formats, syntax types, and the use of punctuation.

Heuristic parsing based on knowledge can be used to create training data for supervised ML. Regular re-training to take account of new entry types, is also possible.

Embodiments may use ML and knowledge to recognize which values correspond to personal data. This ensures that those values are treated in accordance with data protection requirements.

Embodiments may execute rapid grouping and consolidation of entry types in the KG. The parser puts knowledge of entry types into the KG as they are encountered. It then groups and consolidates entry types that are recognized to be the same.

Embodiments of the system can generate and export artifacts for implementing monitoring use cases. This can be aided by the addressability of items in the entry-type structures created by parsing an entry.

Details regarding the role of the knowledge graph according to this exemplary embodiment, are now provided. The KG keeps everything connected and available for use, re-use, extension, enrichment and correction.

The KG allows rapid and accurate understanding when queried and visualized. In the KG, implicit knowledge is made explicit so it can be seen and used.

The KG promotes use of a standard vocabulary, as well as uniformity of logging across different products.

The KG includes automatically created content, and user-loaded content. The Kg Parser automatically and continuously updates the KG with the entry-type structures it discovers as entries arrive. These entry-type structures are represented schematically in FIGS. 7A-C, as well as FIGS. 8 and 9A-B.

Note that the KG stores information about entry types. This is as opposed to storing all the log entries—that is, instances of types.

KG knowledge about formats and syntax types allows the Kg Parser to parse arriving entries to their entry-type structures and syntax types. The KG has knowledge of a few basic formats that are parameterized to describe specific formats of entry types. Details are provided later below.

Users can also upload documentation of entry types. This is often field names and descriptions for structured formats, and keys and key descriptions for key-value formats. Uploading documentation is a way to pre-inform the parser of the basic structure of these entry types.

The leaves of entry-type structures usually have syntax types. An example of a syntax type is an IP Address.

Another syntax type is the event code of a Cisco ASA which has the form: %ASA-d-dddddd: where d represents a digit. This syntax type identifies the event. FIG. 3 offers a sample entry, with a shortened event number for concise illustration.

Some leaves of structures are object types. An object is a string that contains separators, usually whitespace, and that has a specific meaning, e.g., a string that represents a command line or a browser user-agent. Objects can be parsed by an object parser, if appropriate.

The KG also includes inferred knowledge. For example an entry that contains the syntax type Cisco_ASA_Event- Code following a header, is inferred to be of the log type Cisco ASA. This relationship is depicted in FIG. 3 which shows logging concepts.

Some products (like Cisco ASA) include an identifier for the event. Event refers to the action or condition being reported by the software.

In FIG. 3 the entry type and event are the same, but this is not always the case. For example, Palo Alto PAN-OS logs are structured (comma-separated fields) and have two fields that identify the event, the type and subtype fields.

Entries of the "threat" type have the same number of fields and are of the same entry type but may differ by subtype. FIG. 10 shows four methods to identify an event, depending on the format of the event.

Free text may contain an event code. For key-value formats, the value of a key (or keys) may identify an event. For structured formats, the value of a field (or fields) may identify an event. Finally, some combination of the above or the presence of absence of certain keys may identify an event. For some entry types the method to identify an event is known or can be inferred. In other cases, this information is provided by the user.

Unless they can be inferred, log types for entry types are provided by a user. With only entries to go by, the Kg Parser is only able to match entries to types, and create a hierarchical grouping of those.

Other information provided by the user is discussed in connection with representing and exporting monitoring use cases.

A KG makes knowledge visible, extendable, and correctable. A KG is inherently visual. Its contents can be seen and interacted with, and users can see patterns, since patterns in the data are easier to identify visually. It is also possible to visualize changes to the KG over time.

Also, a KG is by nature more flexible than database tables. Specifically, flexibility accommodates variance in identifying a device and deployment. The types of things (concepts) used in the identification cannot be limited to a set schema. Unlike tables, a KG is easily extended with new concepts.

For security use cases, it is also possible to import and link up threat intelligence. Examples are intelligence in standard formats like STIX/TAXII.

A KG can be queried and checked for consistency. A user can also reason over its contents, and compute knowledge from it, or run graph algorithms on it.

The KG also makes it possible to optimize the division of entry types into relational database tables, if variables extracted from entries are stored in such tables. Entries for entry types with similar variables could be stored in the same table, and very different types could be stored in different tables. Division into tables could also be based on how patterns or rules (monitoring use cases) use entry types and attributes in them. One goal of optimization may be to minimize relational joins.

More details about the parsing approach according to this embodiment are now provided. Problems and solutions involved in parsing are described.

The parser has a tokenization procedure that allows it to focus on disambiguating the function of punctuation (also called special characters). This can involve determining the answers to one or more of the following questions:

Is a punctuation character internal to a syntax type?
Does it enclose items or separate them?
Does it separate a key from a value?

FIG. 8 shows an example of tokenization. An entry is split into a series of tokens. Every punctuation character is one token, and all the characters between two punctuation characters constitute one token.

Levels, stopping, and importance of punctuation are now discussed. FIG. 8 shows that an entry has multiple levels if it contains brackets that nest items.

The entry in FIG. 8 shows that the top level is level 0, and the nested list of two numbers is at level 1. A token property named level contains the computed level of each token.

An entry like the one in FIG. 8 is parsed level-by-level. At the top level, its format is a field list with 3 fields. At level 1 is another field list with two numeric fields.

Parsing of an element usually stops if the element has no separators, or when the element has a known syntax type or object type.

In FIG. 8 the first item at level 0 is a leaf of the parse tree. It has the syntax type Cisco_ASA_EventCode.

As shown in FIG. 8 the parser associates to leaf values:
a syntax type (or object type),
name,
description, and
role.

These play a role in normalization of values and names for values.

The format of the entry in FIG. 8 is structured with a space separator at level 0 and structured with a comma separator at level 1. Structured format and field list are synonymous. A structured format becomes a field list after separation at its separator string.

Figure 9A:
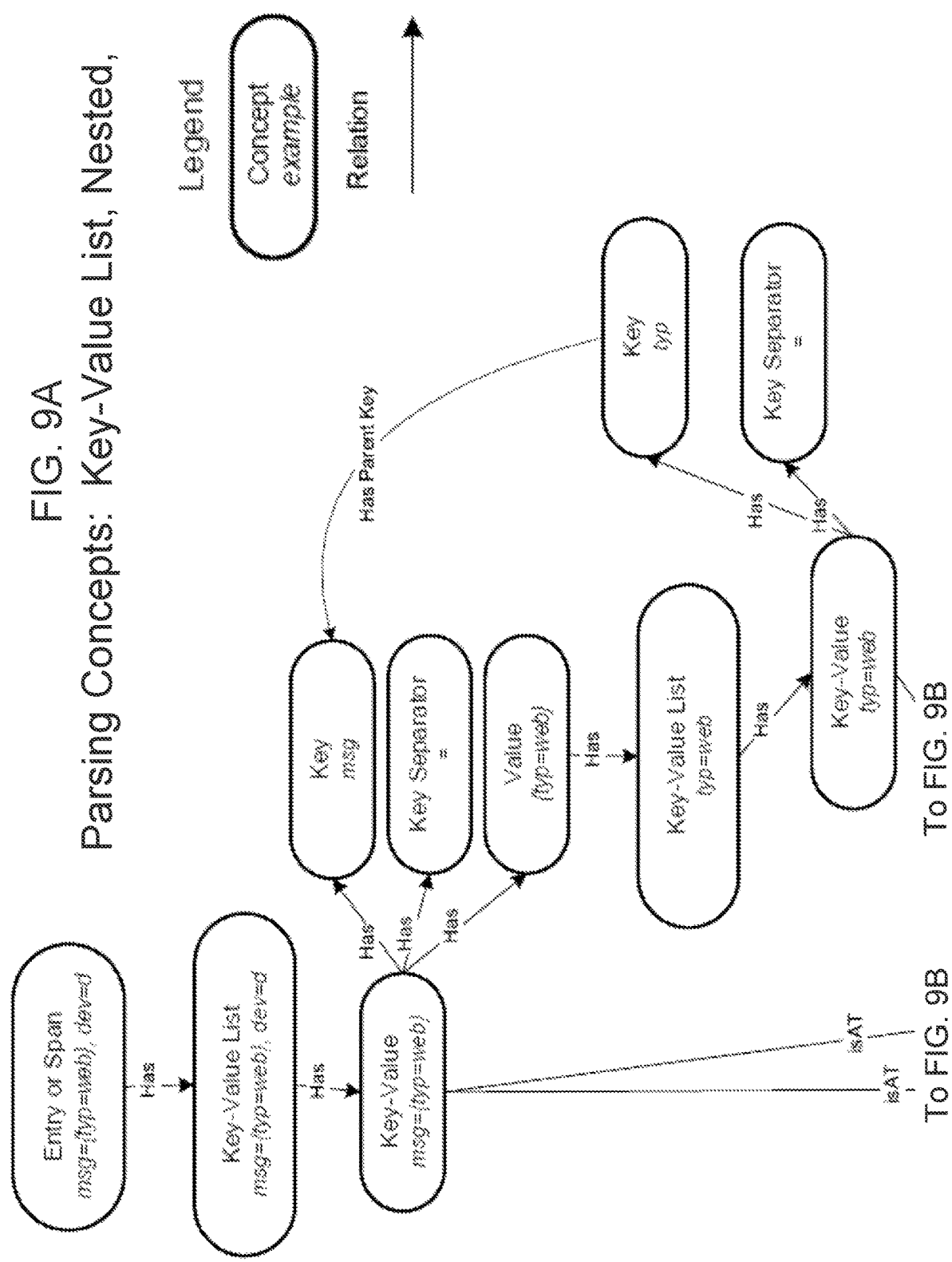
FIGS. 9A-B are flow diagrams showing key-value list and nested parsing concepts.
Figure 9B:
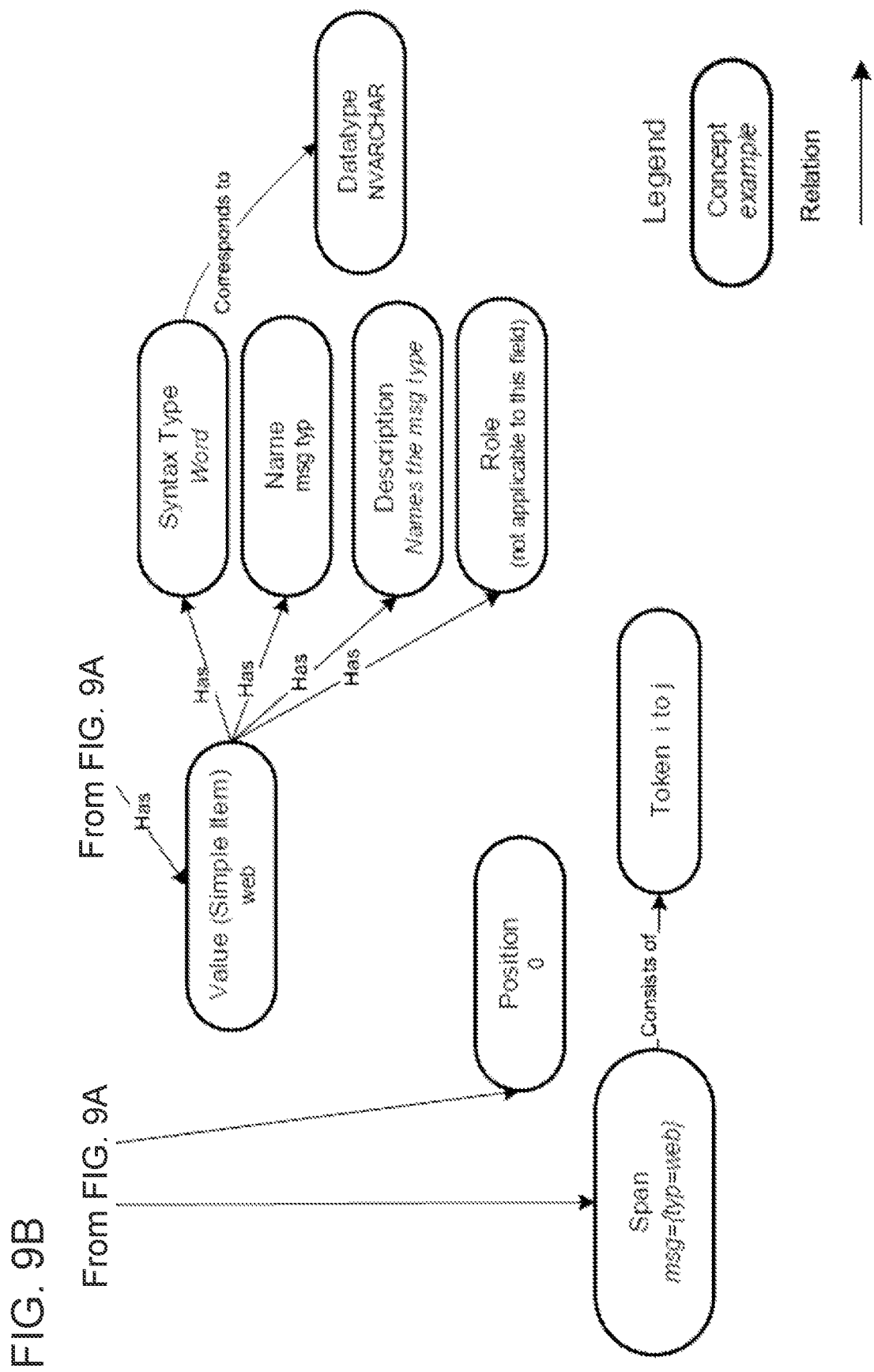

Another format is key-value, also called a key-value list. FIGS. 9A-B show a partial example of the parsed structure of a nested key-value list. The Has Parent Key relation shows that the typ key is in the scope of the msg key.

From review of FIGS. 8-9B, the importance of recognizing brackets, separators and key-value separators is clear. This task involves disambiguating the function of punctuation. For example, a colon may act as a key-value separator or may be part of an IPv6 address.

Generalizing from this example, one question is whether punctuation is internal to a syntax type or not. Only syntax-external punctuation needs to be considered when making parsing decisions.

Possible applicability of machine learning is now discussed. As indicated on the left side of FIG. 11 the starting point for automated parsing is the collection and classification of a large variety of logs.

By considering each level of an entry separately, it is possible to classify the formats into a small number of basic formats distinguished by a set of parameters. Given the basic format and the parameters for a part of an entry, that part can be parsed into its constituent structures (including syntax types or object types) for leaves.

The structures created by parsing allow the generation of new samples by replacing values of syntax types and object types with other values of the same type. Thus, from a small set of samples a much larger training set can be created.

Punctuation models are now discussed. The structures created by parsing represent complete knowledge of the function of punctuation strings in the input string, allowing the labeling of functions. This creates the training data for the punctuation model shown in FIG. 11.

There are various options for this training. It can be thought of as a Named Entity Recognition (NER) task, with the function as the entity label, that is, entity type.

Some possible entity types are:
1. external punctuation
2. internal punctuation
3. key-value separator string
4. key, a key and the punctuation string that separates it from a value are an entity type
5. separator strings of fields or key-value pairs
6. bracket The key entity type (which does include the key) is an aid to solving the format-boundary problem. This arises when another format at the same level precedes the key-value, potentially making it unclear how far back the key extends from the punctuation that separates it from its value.

Figure 12A:
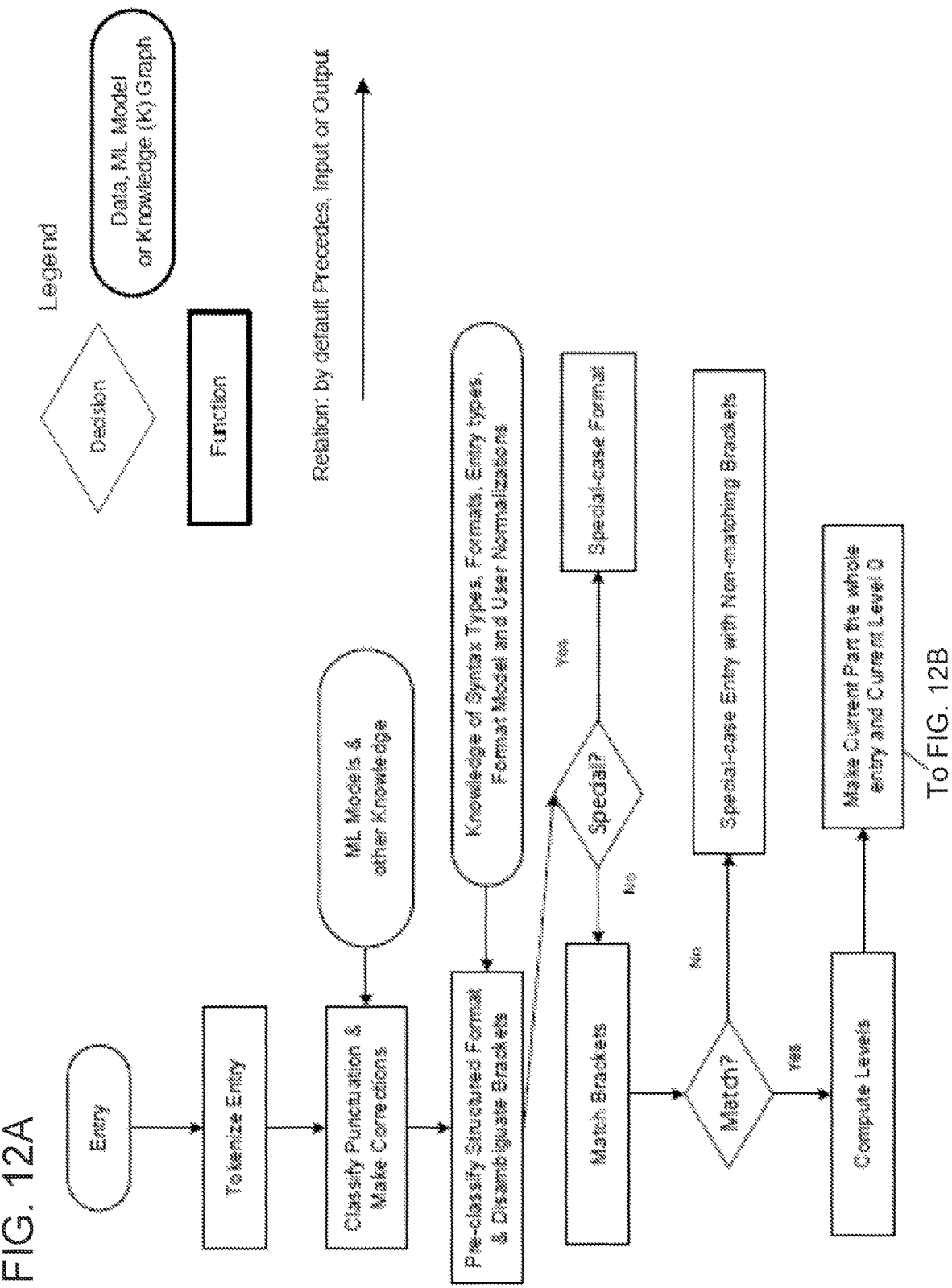

Experiments on the entry types of interest can make the best choice of entity types for NER. The outcome of training is a model that is used by the parser to supplement its knowledge, as shown in FIGS. 12A-B.

According to certain embodiments, a parallel abstracted document may be used. That is, one option to improve the outcome and speed up training is to create a shorter, parallel entry document where each token with content is reduced to one or a few characters to represent the content.

In one example, the letter 'a' may be used to represent purely alphabetic content, and other characters are used for pure digits, etc. Consider the following entry:

%ASA-3-6: (11,99) failed

After tokenization, the document of the entry has the following tokens (where ^ is between tokens):

%^ASA^-^3^-^6^:^ ^(^11^,^99^)^ ^failed

A parallel document with the content tokens abstracted to 'a' for alphabetic and '8' for digits is as follows:

%^a^-^8^-^8^:^ ^a

Other abstractions are possible, e.g., retaining the case of the first letter:

%^A^-^8^-^8^:^ ^(^8^,^8^)^ ^a

Abstracting to multiple characters is also an option. For example, a key that begins with a capital letter and contains some digits might be abstracted to: 'A8'.

Figure 13:
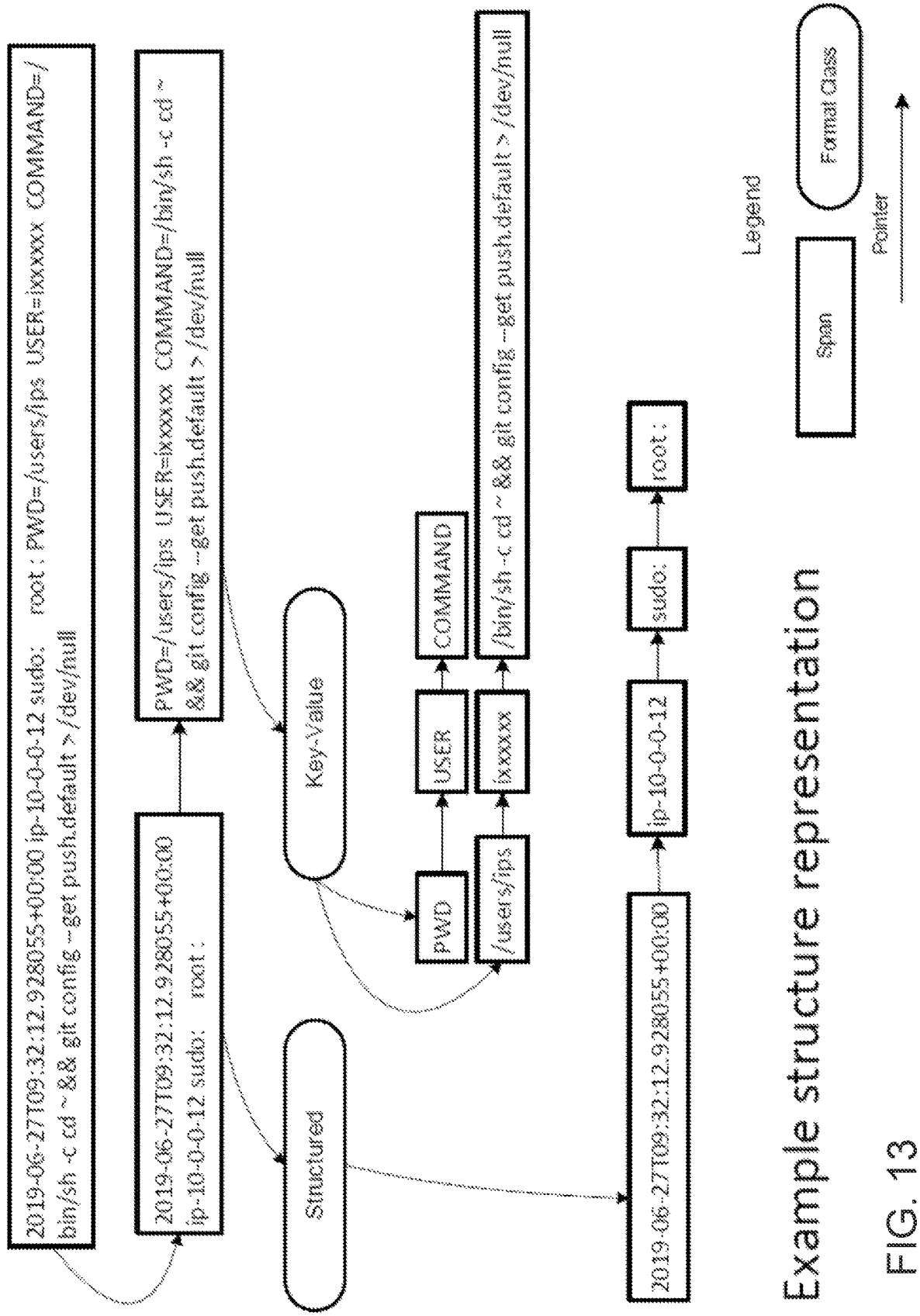
FIG. 13 shows an example structure representation.

Multiple formats are now discussed. FIG. 13 shows an entry with two formats at level 0.

The entry is split into two spans, one for each format. The first span has a structured format with four fields, which are all leaves of the parse tree.

The second span has a key-value format with three keys and their corresponding values. The value of the COMMAND key is an object representing a command line, so is also a leaf in the parse tree, as are the other values of keys.

According to certain embodiments, a tree structure may be represented in yaml. Specifically, yaml is a data serialization format that is a superset of JSON functionality.

Thus, one possible way for a user to adjust the tree structure and/or name elements of it, is with a yaml file for the entry type from the KG, edit it and re-load it to the KG. The yaml file could be checked for consistency and, if accepted, used to guide future parsing of that entry type.

FIG. 13A shows the entry type tree structure of FIG. 13 represented in yaml. The hash (#) character starts a comment in yaml.

Accordingly, yaml could be used to allow user adjustments to the parsing and naming. Giving names or other properties to fields or keys could be accomplished by adding yaml keys for them.

For example, to designate a name to the 3rd field in the structured format, a change could be:

syntax_type: word
sample: sudo
name: program # name for this field

Note that the items like 'word', 'timestamp', and 'hostname' are syntax types. There is also an example of an object in this entry: 'command'.

Figure 14:
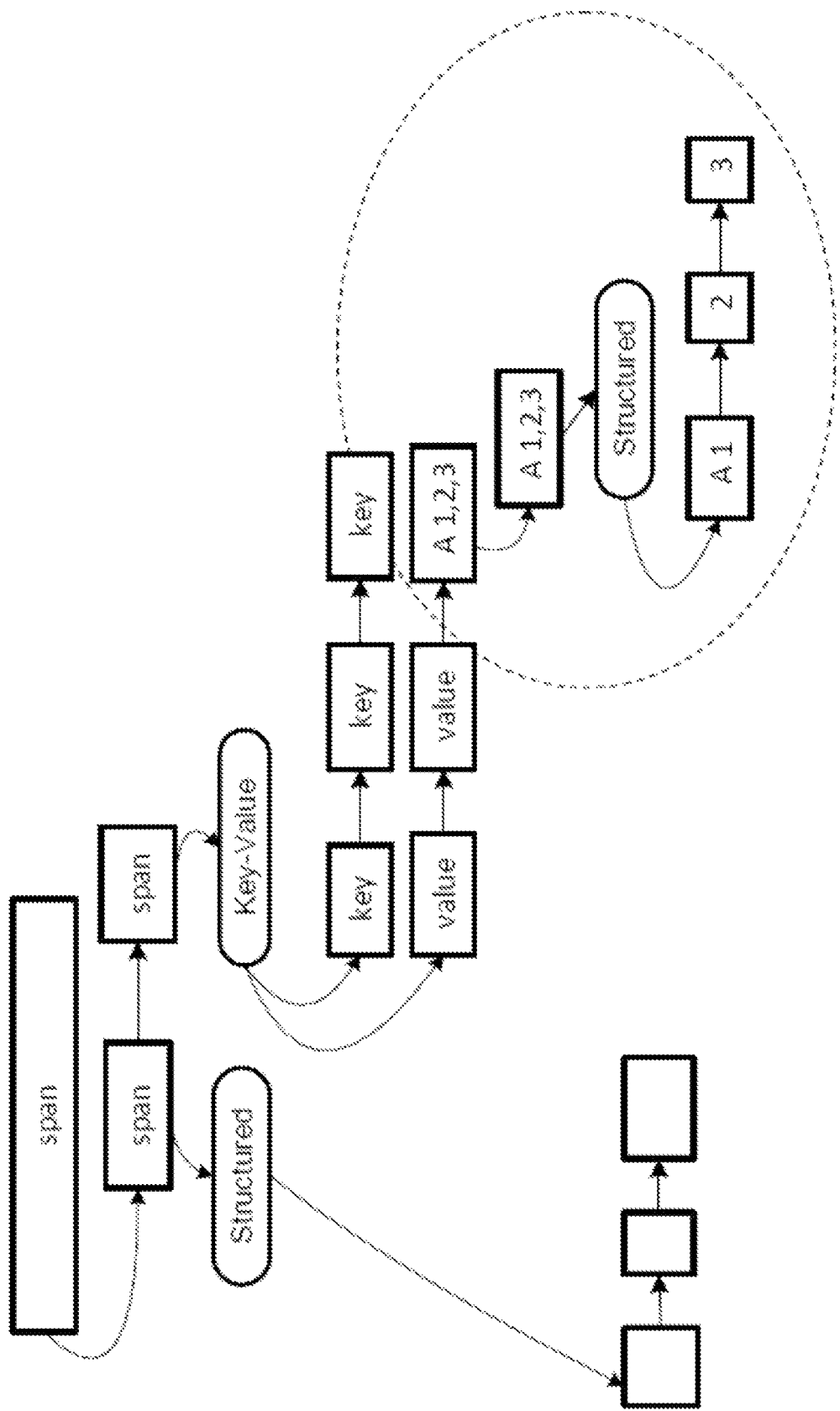
FIG. 14 shows a representation of recursion.

A recursive structure is now described. FIG. 14 is an abstraction of an entry that is similar to the one in FIG. 13. However, instead of the third key having a value that is a leaf, it has a value that needs to be parsed.

The dotted oval in FIG. 14 highlights the structure created by parsing the value to show that the structure looks recursive. It has the same form as the top-level structure, namely a span pointing to a list of spans, each of which points to one format class which points to the spans that comprise the format.

In the example of FIG. 14 there is only one span for the value. But, there might be two if—for example—the user adjusts the format boundaries to divide A 1,2,3 into A and 1,2,3. By default the parser gives precedence to the comma over the space when determining the next format.

Although, it is not shown, the parser would only stop after parsing A1 to its two fields, adding another recursive structure to the parse tree. In any case, the series of leaves and objects that make up the entry are the same regardless of the parsing decisions. This helps the parser decide which entries have the same type. Structures, on the other hand, group items and allow that group to be addressed.

Format classification and the format-boundary problem are now discussed. Determining the format of a string can be viewed as a classification problem.

As shown in FIG. 11, the structures created by parsing are a source of features for this task. The outcome of training is a format model that is used by the parser as shown in FIG. 12B.

The input to this model is a string from which features are calculated. The output is a class that indicates the basic format type and its separator string.

For a key-value format there are two types of separator strings: the separator between the key and value, and the separator between the key-value pairs. For entry types that a user has not normalized, the other parameters of the format are inferred. This is done in a deterministic way so that entries of the same type are treated the same way, and so are comparable.

Various format features are possible, e.g.,
relative begin and end locations of different separators,
the numbers of each separator,
the densities of each separator,
the presence of a certain pattern of separators,
others.

One source of difficulty are entry types that have a series of different formats at the same level. As noted, this gives rise to the format-boundary problem. In these cases, the parser uses its knowledge of the uses of punctuation, the precedence of separators, and the like to decide on boundaries. If these decisions are made for an entry type that a user has not normalized, they are deterministic so that instances of the same entry type can be compared automatically.

Training for the format model can include multi-format strings with the output being a multi-format class that indicates the series of formats and their respective separators. The remaining problem of determining the boundaries is based on parser knowledge or user normalizations. In addition, NER for keys could aid this task by finding keys.

NER format recognition is now described. An alternative or supplement to format classification, is to treat each basic format and separator as an entity to be recognized by NER. This approach would be applied to the entire entry, rather than part-by-part as in the format classification.

Other uses of machine learning are now described. Examples of uses for ML can include but are not limited to:
1. NER for personal data like usernames;
2. NER for syntax types that can contain punctuation that might be mistaken for separators. An example is a partial URL, e.g., just the query part of the URL, which can be hard to recognize based on its pattern.
3. NER to find keys.
4. ML to decide if an entry, field or value is a text message that is to be parsed using a natural language parser
5. Object recognition.

Some usernames can be found using standard off-the-self NER. Others can be found based on expected patterns for user identifiers, that is, specific syntax types.

An object can be difficult to recognize if it is not set off in some way, e.g., is the content of one field, is enclosed in brackets or is the value of a key. For example, the following sample is structured with space separators, but all the fields in bold (starting from Mozilla/5.0) are a user-agent string.

<111> Oct 11 22:33:44 cisco_esa ESA: Mon Aug 10 09:40:17 2020 Info: 40.40.13.164 dummy_user1 LH09MofqDf2j21zW9QN2 200 GET /css/xyz HTTP/1.1 Mozilla/5.0 (Linux; U; Android 2.2.3; en-us; Droid Build/FRK76) Apple WebKit/533.1 (KHTML, like Gecko) Version/4.0 Mobile Safari/533.1

There may be many varieties of user-agent strings. This suggests that a combination of heuristics and an ML binary classifier (is user agent or not) may be appropriate to recognize the user agent.

Mozilla is a hint that there may be a user agent, so the whole rest of the entry could be tested to verify that. If the parser discovers the user agent in some entries, it can apply its new-found knowledge to other entries of the same type. So, as long as the most common user agents can be discovered, the location of the user-agent string can be discovered.

Trade-offs and synergies between syntax and object recognizers, either programmatic or regex-based, and ML, may be assessed.

Figure 15:
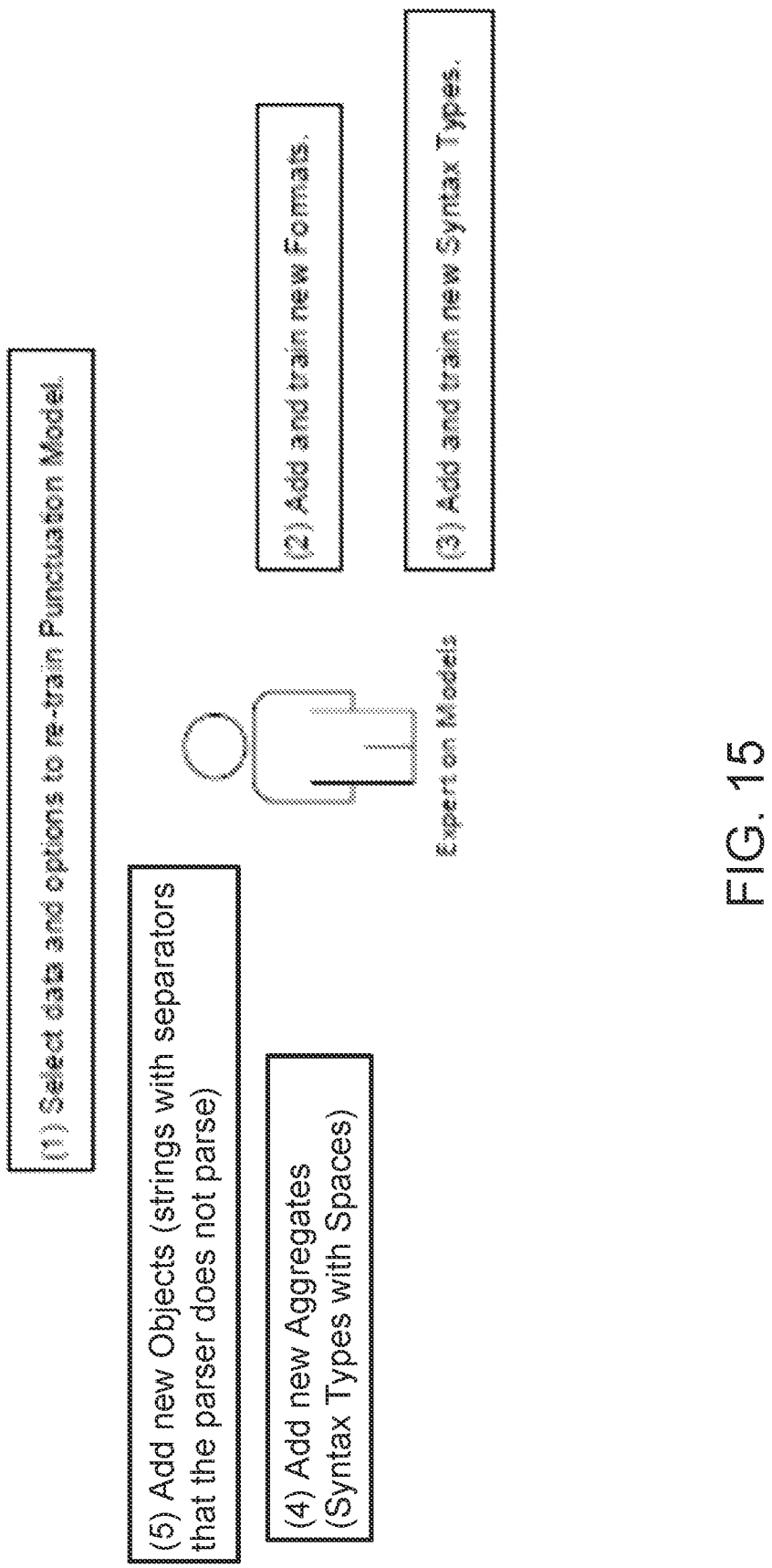
FIG. 15 shows user tasks to update models for entry processing according to an embodiment.

Updating of models is now discussed. FIG. 15 shows user tasks necessary to update the ML models and the KG. Tasks (1)-(3) are the main tasks to update the punctuation, format, and any syntax models. In addition, the user may need to add recognizers for new syntax types, either in the form of programmatic functions or regular expressions.

Task (4) may also be involved if there are new aggregates—that is, contiguous syntax types that need to be aggregated to an item like a timestamp.

Similarly, task (5) may be involved if there are new objects—that is, strings with separators that the parser itself leaves unparsed. Separate parsers for such objects, e.g., SQL statements can be plugged into the system if required.

The overall parsing process is now described. FIGS. 12A-B represent the flow of parsing. The first step is tokenization as explained above.

During tokenization the parser collects all the potential separators, key-value separators and brackets. It also collects the strings that might indicate escaping, e.g., two-character sequences that begin with a backslash, and two consecutive double quotes.

Next, the function of punctuation is classified using ML models, e.g., punctuation models and key-value models.

Evident mistakes (e.g., one token with content is classified as a separator) are then corrected based on knowledge of the potential uses of punctuation, including its use in syntax types.

After this, the function of all potential separators has been determined. So, the parser knows which punctuation strings divide keys from values or might divide fields.

The parser also knows any keys found by a key-value model. From the identified keys the parser may be able to match the entry to a type it has previously seen, or to a type that a user has normalized. If the entry matches a user-normalized type the parser can parse the entry according to the stored user instructions.

The next step is Disambiguate Brackets. This decides which brackets to use in the Match Brackets step. In this step the potential interaction between formats and brackets is accounted for.

If the format is one of the readily recognized standard formats shown in FIG. 1A (e.g. cef, leef, json, others) or if the format is a known aligned-format, brackets are ignored at first, and the format is special-cased.

Fields or values of special-cased formats may also be further parsed if they contain formats, as opposed to objects or syntax types. As one example, a key in a json format may contain a text message with embedded keys or variables. This message needs to be parsed to extract the variables and understand the message.

A disambiguate and match brackets may be done on the message before parsing, since that step is omitted for special-cased formats.

As part of disambiguation of brackets, the parser performs a pre-bracket-match format classification to decide if the format is structured. If it is structured, the parser ignores brackets that would match across actual separators. It also takes account of brackets, usually double quotes, that enclose a field's content to signal that any separators in the field should be ignored when breaking the string into fields.

Knowledge of syntax types allows the parser to double-check its decisions by seeing if the syntax type of the field matches a type that can contain the separator string used by the structured format. This ability also enables the parser to correctly parse an erroneous format that omitted to escape the separators in the syntax type. Details of the parsing of structured formats have been provided above.

If the format is not special-cased, the parser performs the Match Brackets step which matches any brackets that are not marked as ignore. If there are no matching errors the parser continues with Compute Levels, which computes the nesting level of each token.

If there are errors, the format is special-cased, e.g., parsed without any bracket matching, or bracket-matched using a special procedure. Alternatively, a user might specify which brackets to ignore so that the remaining brackets match.

After computing levels, the parser limits consideration to level 0. An example of this is shown in FIG. 8, Spans limited to Level m.

If the parser did not pre-classify the format as structured, it now classifies the format(s) to be able to parse it. If necessary, the parser divides the span into a span for each format as discussed above. An example of division into spans is shown in FIG. 13.

The parser has a default deterministic procedure for dividing a span into separate formats, but a user can override that algorithm for specific entry types. The format decision tree in FIG. 1A indicates how punctuation can be used to decide which format is present.

The decision is, however, more complicated in two respects. One is determining the extent of the format. The other is deciding which separator to use if the span contains interleaved separators.

By default, the separator-decision is based on a precedence order for separators. The first format uses the separator with the highest precedence. For example, if a span contains inter-leaved tabs and spaces and is structured, the first format is a structured format with tab as the separator. Its fields contain space-separated content or simple content. Space-separated fields will be parsed in the next round unless they match an object.

Each format span is parsed into its constituents according to its format type. Structured formats are parsed into fields, and key-value formats are parsed into keys and values.

The next step is to decide whether to continue parsing each field or value. Inputs to this decision are the context and content of the field or value.

In most cases the content is compared to the known syntax types and objects. If it matches one, parsing stops for that field or value. Otherwise, if it contains separators the parser adds it to a list of parts to be parsed.

Some string patterns are ambiguous as to syntax type. In which case, the parser attempts to disambiguate the syntax type based on the context of the string. Non-destructive tokenization and parsing result in the parser having access to the full context of strings to make this decision.

A last step in processing a format span is to check for aggregates, e.g., the space-separated items that make up a timestamp. These are aggregated to create the respective aggregate—that is, timestamp.

Parsing of messages using natural language processing is now discussed. An entry, a field, or a value of a key may contain a natural-language text-message intended to convey the meaning of the entry.

The parser recognizes this by heuristics and/or machine learning, and parses the message using natural language processing. This permits assessment of the relevance of the entry type to the purposes of monitoring logs.

A few types of entries may contain a foreign message, that is, an entire entry from another source. The parser will parse foreign messages to their constituents. It may even match them to entry types, depending on which entry types it knows about or has seen. In addition, a user is able to tell the parser to expect a foreign message in a specific location of an entry type.

Optimization of syntax type determination is now discussed. Syntax type determination can be optimized if the parser finds that a format matches a known entry type (e.g., the entry matches a known type that is structured, has a comma separator, and has twelve fields.)

When computing syntax types for an item, the parser calls only the recognizers for syntax types that occur in the respective item of the matching entry type. If no syntax type is determined, the syntax type is computed as usual.

Grouping and consolidation of entry types is now discussed. The KG stores hierarchically structured groups of entry types that the user can browse and query to see what types of entries the system has seen, and also to control parsing and processing.

User control of parsing and processing is now described. The system provides extensible mechanisms for a user to override the default processing for an entry type or group. For example, a user can see the structures of an entry and can adjust them, e.g., instructing the system where the header boundary is, or instructing the system to consider all the text following a comma in free text as one field.

Some other examples of user control are normalization instructions and control of bracket-matching. The last option is useful for entries that have mis-matched brackets using the default bracket-matching algorithm.

For optimization purposes, the user might also instruct the system to ignore or discard entries or groups of entries.

Format types are now described. Format is the structure of a text string. This structure is created by punctuation that encloses, delimits, and imparts structural roles to the content of the string.

An example is the following string that represents a list of key-value pairs.

timestamp=2020-03-26T21:33:53.294Z,
   principal=access-token,
   type=AUTHENTICATION_FAILURE The comma has the function of separating key-value pairs. The words in front of the equal character have the structural role of keys, and the strings appearing after the equal characters but before the comma, have the role of values of the respective keys.

Many log entries are nested. That is, they have content inside of content. Nesting is usually done by enclosing content with brackets. Every such enclosure represents a nested item at the level equal to one more than the current level.

Strategy for determining format is now described. Many log entries have ad-hoc formats invented by developers, often seemingly out of thin air.

Entries may also have different formats at different levels of nesting. For this reason, the formats in an entry are determined part-by-part, and level-by-level, starting with the top level of the entry, level 0. The top-level format is called the main format.

The format of a given part is determined after limiting attention to the current nesting level, substantially reducing the range of patterns that occur. Thus, determination of the format does not usually look inside any brackets, since the brackets increase the nesting level.

Exceptions may be made for some formats with no content at the level being considered. An example is a format like [ . . . ] [ . . . ], where the brackets contain syslog structured data blocks.

Exceptions may also be made for well-known formats like: JSON, CEF and LEEF. These are easy to recognize and are special-cased.

Some logs do have a series of formats at the same level. One example is a whitespace-separated header, followed by free text followed by a key-value list, followed by more free text, etc.

Location is the context in which the format or other object being described is found. Location information can allow answering the following questions.

Is it at the top-level?
Is it in a field of a structured list, or is it in the value of a key?

Location may be specified using the following notation:
10 at level 0
h in the header, but the location varies, probably because the header is configurable
h3 in field 3 of the header, fields are numbered starting at 0
f1 in field 1 of a structured list
flast in the last field (complex values like SQL statements often occur in the last field; (flast avoids the need to count fields.)
<key> is the value of a key, e.g., msg. The key is quoted if it clashes with location names, e.g., 'h3'
<key>ˆ<key> in the value of a nested key, e.g., messageˆ-custom Headers are now discussed. A log entry can often be divided into a header, or sometimes multiple headers, and a body that follows it.

Sometimes the header is written by the device that writes the entry. Other times it comes from a log collector that prepends it to the log entry created by the device.

There may be multiple headers, for example, if the device writes one and a log collector adds one. In some cases, the main message (the one that identifies the event represented by the entry) may appear in the value of a key.

If there is documentation for entries it normally documents only the body of the entry. This provides a way to decide where a body starts, since it should match one of the documented templates for bodies.

A header normally contains a timestamp and some identifiers of the device and software that logged and/or collected the entry. Some headers are fixed length with fixed locations for the time fields and identifiers. Most, however, tend to have a structured format that uses whitespace as a field separator.

Another way to think of headers is that some software writes multiple events, but all the events will have a header in common. So, a header is the common prefix to multiple different events from the same device.

The complexity of parsing is increased if a device allows the user to configure the header that is written with the body. Configurable headers, and bodies, seem to be common in open source software.

A given format is a variant of a basic format. The following is an initial list of basic formats which may be extended as new basic formats are encountered.

Key-Value Formats
  JSON
  Common Event Format (CEF)
  Log Event Extended Format (LEEF)
  key-value (keyValue)
  bracketed key-value
  key-value with count (keyValueWithCount)
  keyBracketed Value
Free Text
  free text, space separated textual message
Structured Formats
  structured, a list of fields separated by a separator string (structured)
  bracketed structured
  structured Data Block of Syslog RFC 5424 (2009):
  aligned columns as in Microsoft Sharepoint
  List Log Format 2.0
  Syslog RFC 3164 (2001), header format
  Syslog RFC 5424 (2009), header format The manner of describing formats is now discussed. Description of a format is derived by answering questions about it.

Answers to most questions are computed by the parser and stored in the KG. One example is the number of items in a structured format.

Answers to some questions are not always contained in log entries. These are provided by a user, for example, identification of the source of the entry (e.g., vendor, product, and version.

The user can also confirm automated parsing results, add comments, or add samples to a representative collection automatically maintained by the system.

For true/false questions the digit 1 is true, and 0 is false. If the question is not applicable, the answer is "na" for not applicable. In some cases, the answer to a question can be a regex, e.g., to match a separator string.

The information about formats can be thought of as a table, where every row in the format table contains at least the following columns which answer corresponding questions:

device the type of software or device that writes the entries
  deployment the identification of the deployment location of the device
  location the level or location of the format being described. Zero is the top level.
  basicFormat the format used by the device or platform at the given level or location
    this is a name of one of the basic formats
    the answer to this question determines which further questions are applicable.
  error description of any error in the format, e.g., a missing separator
  comment any comments or observations about the format
  samples a collection of samples of the format.

Although, a table could be used to upload information to the system, the format information is represented in KG form to allow flexibility. One example of the need for flexibility is that the way for identifying a device and deployment vary so widely, that the types of things (concepts) used in the identification cannot be limited to a set schema. Unlike tables, a KG is easily extended with new concepts.

Moreover, the purpose of the additions is made clear by relating them to other concepts. For example, an entry type may come from a piece of software deployed in a cloud or may come from software on a server in a network.

Both the way of identifying the software and the way of identifying where it is deployed, will differ in the two cases. But, by making the specific identification-types subclasses of the general concepts Device and Deployment their purpose is clear.

Syntax types are now described. A syntax type corresponds to a leaf of the parse tree.

A syntax type might have an internal structure, but this internal structure is knowledge about the syntax type. For example, the pattern:

11.11.10.10#330 is a syntax type that consists of an IP address and an IP port separated by a hash character. The parser recognizes it as an IP-port syntax type.

Many syntax types have both a form and meaning, e.g., an IP address. Others, however, e.g., the form 0x followed by hexadecimal numbers can have many potential meanings. It might be a hash value or a memory address, etc. A few syntax types like a word express only the form of an item.

Syntax types help to achieve full automation. If an entry can be parsed into a series of syntax types and external punctuation, full visibility into the contents of the entry is achieved. If, in addition, the syntax types can be identified as being variable or fixed, the entry type can be easily determined for many formats.

If ML recognition of external punctuation were 100% accurate, the line could be parsed by simply:
  breaking it at the external punctuation,
  determining the syntax types of the remaining spans,
  matching keys to values, and
  aggregating the elements of space-separated items, like some time formats, into one item.

Heuristic decisions may be used in case the NER makes mistakes. A positive aspect of syntax types is that they tend to be characteristic for a vendor, product or event, helping to identify the event or its producer.

Another positive aspect of using syntax types is that there are relatively few of them in number, because many are identified by their pattern rather than their meaning.

Aggregates are now discussed. Given its format-centric approach, the parser interprets a space-separated header as a structured format. Consequently, the elements of a timestamp that contains spaces are separately recognized and are aggregated into a timestamp after parsing.

The first timestamp in bold in the following example, shows such an aggregate.

<111> Oct 11 22:33:44 cisco_esa ESA: Mon Aug 10 09:40:17 2020 Info: 40.40.13.164 dummy_user1 LH09MofqDf2j21zW9QN2 200 GET/css/xyz HTTP/1.1 Mozilla/5.0 (Linux; U; Android 2.2.3; en-us; Droid Build/FRK76) Apple WebKit/533.1 (KHTML, like Gecko) Version/4.0 Mobile Safari/533.1

The parser is able to aggregate the items to the timestamp because it knows that they might be related to time.

Objects can occur in fields or key values. Specifically, some fields or key values may contain separators but should either not be parsed, or should be parsed by a type-specific parser. Some example objects of this nature are listed below.

User Agent String (userAgent)
SQL statement (sql)
HANA (sqlHana)
Oracle (sqlOracle)
Command (cmd), e.g., /bin/sh-c cd~& & git config—get push.default>/dev/null Such objects are recognized, but not parsed by the parser itself.

It is noted that certain embodiments may leverage the processing power of an in-memory database engine, in order to perform one or more event monitoring functions. For example, according to one embodiment the S/4HANA in-memory database engine of the S/4HANA in-memory database available from SAP SE of Walldorf, Germany used to store a knowledge graph, could be leveraged to perform the parsing and/or tokenization procedure.

Details regarding storage of entry types into the KG are now provided. In particular, the system puts entry types into various groups as it decides that they are the same or similar despite some differences.

Entries are abstracted before being compared. Some entry types are also consolidated to one entry type as the system discovers more about them.

The hierarchical structure of entry types can be thought of as a tree that groups related entry types. Leaves of the tree represent individual entry types, whereas a non-leaf node characterizes a group of related entry types. User instructions for controlling parsing and normalization can occur at leaf or non-leaf nodes.

The concept of abstraction is now discussed. An entry is abstracted by replacing potentially variable fields with their syntax types or object types. Words, however, are retained under the assumption that they may be fixed text. Punctuation outside of syntax and object types is also retained.

As an example of abstraction, the entry:

Jul 25 12:17:41 enigma.co ossec: Alert Level: 3; Rule: 5715—SSHD authentication success.;

has the abstraction shown below, with the syntax types represented as names inside angle brackets:

<month> <integer> <time> <host> ossec: Alert Level: <integer>, Rule: <integer>-SSHD authentication success.;

Two entries may have a same entry type. Determination of sameness depends on the basic formats in the entry.

As a first condition, two entries can only be the same type if they have the same sequence of level 0 basic formats and parameters. This condition limits the search for a matching entry type to the group of entry types with the same level 0 format(s).

During matching the exact number of contiguous spaces present do not usually need to match, since this sometimes varies. For example, two spaces may precede a one-digit number, but a two-digit number may only be preceded by one.

Further determination of sameness depends on the type of basic formats present:
structured,
key-value, or
free-text.

Two structured formats match if:
they have the same number of fields (which was checked when comparing level 0 formats), and
the syntax types and object types of respective fields match or are comparable, e.g., a hostname is comparable with an IP address, because both can identify a node in an IP network. If a field contains free text, the system can create sub-groups for entries with matching free text.

Two key-value formats match if their keys match. For keys to match any brackets around the key, the exact case of the key, and the key-value separator (or opening bracket around values) must match, ignoring spaces around the key-value separator.

If keys are nested, the key and all its parent keys must match. Sub-groups are created for entry types that share keys, since that may indicate they are from the same device type.

The system can also create sub-groups by matching the values of the keys. Entry types with matching abstracted values of keys are in the same sub-group. As with structured entries, if a value contains free text, the system can also create sub-groups for entries with matching free text.

Two free-text formats match if they match a common template. FIG. 3 shows two free-text entries of the same type; they match the same template:

%ASA-3-1: send <Integer> failed

Matching free text can be more complex than matching the other basic formats. In particular, a free-text entry can be thought of as being generated from a template by replacing placeholders in the template with actual values. Some vendors include such templates in their documentation.

If the values that replace placeholders contain no spaces, the same number of spaces, or are enclosed in brackets, two entries match if they have matching abstractions at level 0.

If, however, any values may contain a variable number of spaces, and are not enclosed in brackets, the number of level-0 items may be different for two entries of the same type as shown in the next example—two entries of the same type with different length usernames:

authenticated user D000001 at switch
authenticated user Bob Smith at switch

Still, by comparing multiple entries, the system can decide that the items between user and at switch are variables, so that the entries are the same type. After making this decision the system consolidates the entry types to the same type.

The system can also use other evidence to discover variable items. In one example, the presence of non-ascii letters often indicates a variable in English-language logs, since all the English fixed-text normally contains only ascii characters.

Many vendors combine text with key-values. Such entries are divided into separate formats before being processed and matched. However, Natural Language Processing (NLP) may still be applied to the entire entry or parts of it (as opposed to being limited to textual parts only). Abstraction may be applied before NLP.

Various types of consolidation may occur. Consolidation occurs as the system discovers sameness despite differences. One type of consolidation involves discovering variables like the ones in the previous section.

Another type of consolidation uses event identifiers to find variables. For example, the %ASA-4-2 code identifies one event, yet the abstracted entries do not match. But they do match if the state names are abstracted to a variable.

Example—two fictitious abstracted entries that have the same event code:
%ASA-4-2: switch <IP> changed to state down
%ASA-4-2: switch <IP> changed to state up
Example: state abstracted to a variable:
%ASA-4-2: switch <IP> changed to state <state>

After abstraction, the two entry types are consolidated to one.

Header and body groupings are now discussed. The system also groups entries that share headers and entries that share bodies.

The intent is to discover headers that are common to different bodies (events) and bodies (events) that occur with different headers. The first may correspond to a device that uses the same format header for diverse events. The second may correspond to the same event from the same device-type configured to use different headers.

Header matching is now discussed. An example header is:
2019-06-27T09:32:12.928055+00:00 ip-10-0-0-12 sudo: root:
With the syntax types represented as names inside angle brackets, this becomes:
<timestamp> <hostname> sudo: root:
Assume there is another entry type that has the header:
2019-06-27T09:32:12.928055+00:00 ip-10-0-0-12 sudo: admd:
After abstraction the two headers match until the last field, so are grouped together as sharing the header:
<timestamp> <hostname> sudo:
What has been called a header here, might be a bit different from what is normally thought of as a header. This is because the example header is the space-separated beginning of the entry up until the start of a key-value list, as shown in bold below.
2019-06-27T09:32:12.928055+00:00 ip-10-0-0-12 sudo: root: PWD=/users/ips
USER=ixxxxx COMMAND=/bin/sh-c cd~&& git config—get push.default>/dev/null If the entire level 0 is a space-separated format the computation of a header-body boundary is harder. It can only be done if the header has a known format, e.g., a syslog format, or by the discovery of bodies that match but are preceded by different headers.

Key-based headers can occur in key-value formats. For example, entries might share keys that always occur first in the entry. If these are followed by different keys for different entries, this may indicate the entries come from a common platform or device, but different software functions.

Body matching is now described. Entries are grouped by bodies by comparing them from back to front. If they match until what is left is plausibly a header, the entry types are grouped. The idea behind this group is that such entry types likely come from the same type of device with configurable headers, and the headers were configured differently.

Formats with event codes are matched as follows. There are a few vendor-formats, like the Cisco ASA free-text format, which identify events by a code in the entry.

This is also true for the cef and leef standard formats. There, two entries with the same event code are usually the same entry type.

If, however, contrary to expectation the values of fields or keys do not match after abstraction, sub-groups can be created for those that have matching,
abstracted fields,
keys, or
free text values.

Structured data blocks are matched as follows. A structured data block is enclosed in square brackets and starts with an identifier that contains the character @. This is followed by a space and a key-value list.

Structured data blocks with the same id are in the same group. Sub-groups are created for those with the same keys. Further sub-groups can be created based on the values of keys, as described for key-value formats.

The type of an entry may be recognized as follows. Matching starts at the top of the tree of entry types with the level 0 formats. There is an entry-type node for each sequence of formats that has been seen. Each of the formats in a sequence is matched in the format-specific manner explained above.

Matching progresses through sub-nodes of the tree to a leaf or a non-match. A matching leaf is considered to be the entry type of the entry. If there is no match a new node is added to the tree because the entry represents a new type.

Usually matching is done from back to front since, due to shared types of headers, entry types are more different near the end, so non-matching is detected more quickly.

A special node at the top of the tree represents entry types with mis-matched brackets. Sub-nodes of this node represent various entry types with mis-matched brackets. User instructions to deal with such entry types can be associated with the respective nodes.

Figure 16:
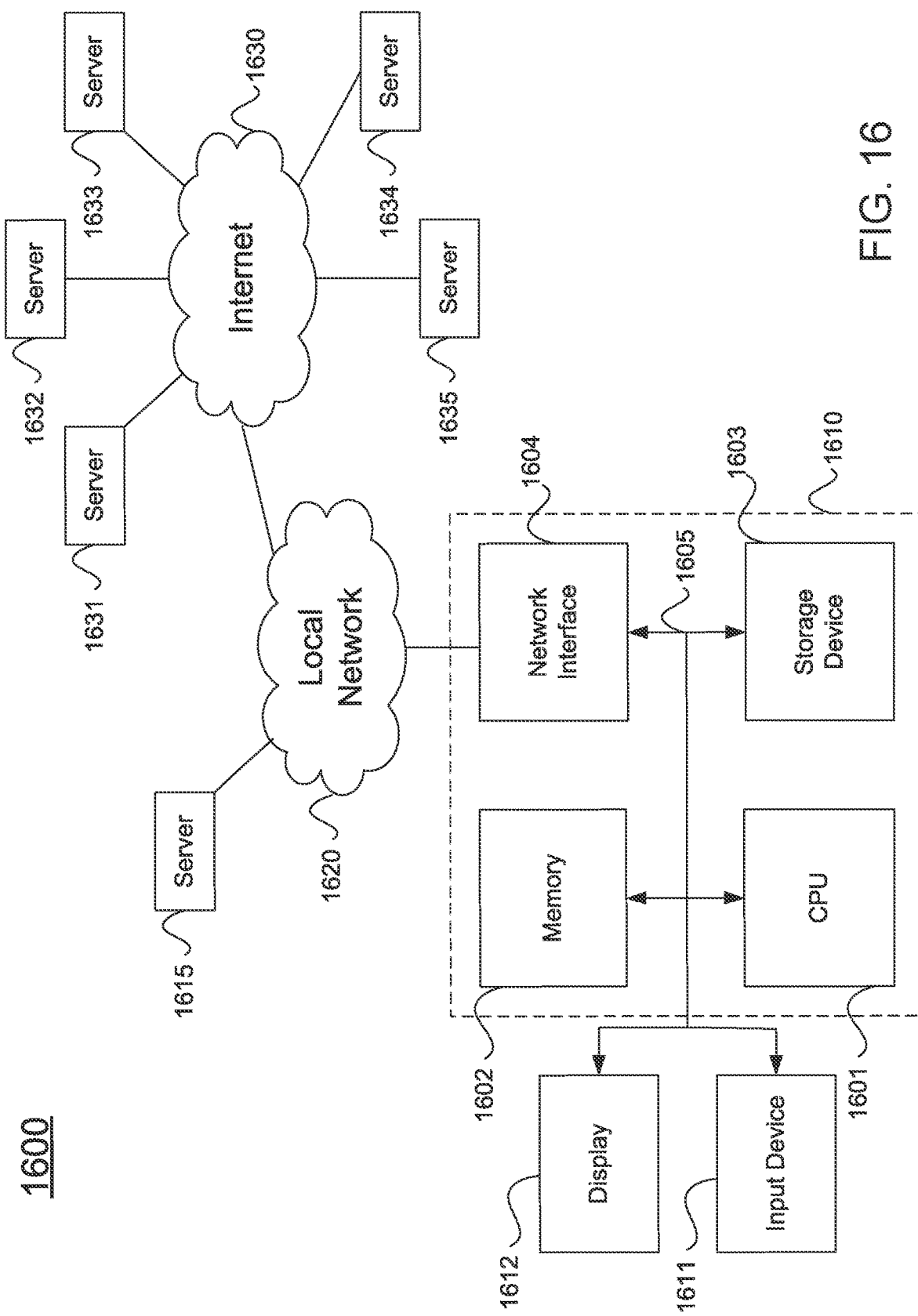
FIG. 16 illustrates an example computer system.

An example computer system 1600 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a Light Emitting Diode (LED) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method comprising:
providing a visualization of a first tree data structure comprising a first plurality of nodes, wherein the first plurality of nodes corresponds to pre-defined format hierarchies stored in a database;
receiving an input comprising one or more formats;
parsing the input to generate a second tree data structure comprising a second plurality of nodes, wherein the second plurality of nodes represents a hierarchy associated with the one or more formats;
performing a comparison of the second tree data structure to at least a portion of the first tree data structure;
determining a non-exact match based on the comparison, wherein the non-exact match indicates that the second plurality of nodes comprises one or more new nodes not included in the portion of first plurality of nodes;
storing the one or more new nodes in the first tree data structure by modifying the first plurality of nodes to include the one or more new nodes; and
in response to storing the one or more new nodes, updating the visualization such that the hierarchy is visualized in the visualization based on the first plurality of nodes and the one or more new nodes.

2. The method as in claim 1, wherein the second plurality of nodes comprises a set of internal nodes, the set of internal nodes representing the one or more formats, wherein parsing the input comprises applying a first machine learning model to the set of internal nodes, the first machine learning model configured to classify the internal nodes based on the pre-defined format hierarchies.

3. The method as in claim 2, wherein parsing the input further comprises:
determining that a particular node of the second plurality of nodes cannot be classified by the first machine learning model;
identifying one or more elements of the particular node preventing classification;
processing the particular node to remove the one or more elements; and
applying the first machine learning model to the particular node to classify the particular node.

4. The method as in claim 2, wherein the second plurality of nodes comprises a set of leaf nodes related to the internal nodes according to the hierarchy, wherein parsing further comprises applying a second machine learning model to the set of leaf nodes, the second machine learning model configured to identify numeric data elements of the input associated with the set of leaf nodes.

5. The method as in claim 1, wherein each of the one or more formats comprise parameters defining the hierarchy associated with the one or more formats and wherein providing the visualization includes correlating a plurality of visual user controls in the visualization with the parameters.

6. The method of claim 5, wherein receiving the input comprises:
receiving a set of changes to the plurality of visual user controls; and
propagating the set of changes to a set of rules stored in the database, the set of rules controlling traversal of the first tree data structure during parsing.

7. The method as in claim 1, wherein, in response to determining an exact match based on the comparison, the exact match indicating that the first plurality of nodes includes the second plurality of nodes, consolidating the first plurality of nodes and the second plurality of nodes into a single set of nodes and grouping the single set of nodes in the visualization.

8. The method as in claim 1, wherein the input is a log entry identifying an event of an external software module, wherein the log entry comprises at least one header coupled to a body of natural language content, wherein the header comprises one or more text strings exhibiting the one or more formats, and wherein the body of natural language content describes the event.

9. The method as in claim 1, wherein the one or more formats comprises a structure for a text string in the input, wherein the structure is defined by a plurality of text characters in the text string, wherein the plurality of text characters imparts structural roles to the text string.

10. The method as in claim 1, wherein the pre-defined format hierarchies include a plurality of data structures representing a plurality of hierarchies for previous inputs and wherein the plurality of data structures is grouped into the first plurality of nodes based on similarities between corresponding hierarchies of the plurality of hierarchies.

11. A non-transitory computer readable storage medium embodying a computer program for performing a method, the method comprising:
provide a visualization of a first tree data structure comprising a first plurality of nodes, wherein the first plurality of nodes corresponds to pre-defined format hierarchies stored in a database;
receiving an input comprising one or more formats;
parsing the input to generate a second tree data structure comprising a second plurality of nodes, wherein the second plurality of nodes represents a hierarchy associated with the one or more formats;
performing a comparison of the second tree data structure to at least a portion of the first tree data structure;
determining a non-exact match based on the comparison, wherein the non-exact match indicates that the second plurality of nodes comprises one or more new nodes not included in the portion of first plurality of nodes;
storing the one or more new nodes in the first tree data structure by modifying the first plurality of nodes to include the one or more new nodes; and
in response to storing the one or more new nodes, updating the visualization such that the hierarchy is visualized in the visualization based on the first plurality of nodes and the one or more new nodes.

12. The non-transitory computer readable storage medium as in claim 11, wherein the second plurality of nodes comprises a set of internal nodes, the set of internal nodes representing the one or more formats, wherein parsing the input comprises applying a first machine learning model to the set of internal nodes, the first machine learning model configured to classify the internal nodes based on the pre-defined format hierarchies.

13. The non-transitory computer readable storage medium as in claim 12, wherein parsing the input further comprises:
determining that a particular node of the second plurality of nodes cannot be classified by the first machine learning model;
identifying one or more elements of the particular node preventing classification;
processing the particular node to remove the one or more elements; and
applying the first machine learning model to the particular node to classify the particular node.

14. The non-transitory computer readable storage medium as in claim 11, wherein each of the one or more formats comprise parameters defining the hierarchy associated with the one or more formats and wherein providing the visualization includes correlating a plurality of visual user controls in the visualization with the parameters.

15. The non-transitory computer readable storage medium as in claim 11, wherein, in response to determining an exact match based on the comparison, the exact match indicating that the first plurality of nodes includes the second plurality of nodes, consolidating the first plurality of nodes and the second plurality of nodes into a single set of nodes and grouping the single set of nodes in the visualization.

16. A computer system comprising:
one or more processors;
a software program, executable on the computer system, the software program configured to cause an engine to:
provide a visualization of a first tree data structure comprising a first plurality of nodes, wherein the first plurality of nodes corresponds to pre-defined format hierarchies stored in a database;
receive an input comprising one or more formats;
parse the input to generate a second tree data structure comprising a second plurality of nodes, wherein the second plurality of nodes represents a hierarchy associated with the one or more formats;
perform a comparison of the second tree data structure to at least a portion of the first tree data structure;
determine a non-exact match based on the comparison, wherein the non-exact match indicates that the second plurality of nodes comprises one or more new nodes not included in the portion of first plurality of nodes;
store the one or more new nodes in the first tree data structure by modifying the first plurality of nodes to include the one or more new nodes; and
in response to storing the one or more new nodes, update the visualization such that the hierarchy is visualized in the visualization based on the first plurality of nodes and the one or more new nodes.

17. The computer system as in claim 16, wherein the second plurality of nodes comprises a set of internal nodes, the set of internal nodes representing the one or more formats, wherein parsing the input comprises applying a first machine learning model to the set of internal nodes, the first machine learning model configured to classify the internal nodes based on the pre-defined format hierarchies.

18. The computer system as in claim 17, wherein parsing the input further comprises:
determining that a particular node of the second plurality of nodes cannot be classified by the first machine learning model;
identifying one or more elements of the particular node preventing classification;
processing the particular node to remove the one or more elements; and
applying the first machine learning model to the particular node to classify the particular node.

19. The computer system as in claim 16, wherein each of the one or more formats comprise parameters defining the hierarchy associated with the one or more formats and wherein providing the visualization includes correlating a plurality of visual user controls in the visualization with the parameters.

20. The computer system as in claim 16, wherein, in response to determining an exact match based on the comparison, the exact match indicating that the first plurality of nodes includes the second plurality of nodes, consolidating the first plurality of nodes and the second plurality of nodes into a single set of nodes and grouping the single set of nodes in the visualization.

* * * * *